(12) United States Patent
Howell et al.

(10) Patent No.: US 10,084,761 B1
(45) Date of Patent: Sep. 25, 2018

(54) IN-BAND IDENTITY VERIFICATION AND MAN-IN-THE-MIDDLE DEFENSE

(71) Applicant: Wickr Inc, San Francisco, CA (US)

(72) Inventors: Christopher Howell, Freehold, NJ (US); Robert Statica, Long Valley, NJ (US); Kara Lynn Coppa, Long Valley, NJ (US)

(73) Assignee: Wickr Inc, San Francisco, CA (US)

( * ) Notice: Subject to any disclaimer, the term of this patent is extended or adjusted under 35 U.S.C. 154(b) by 0 days.

(21) Appl. No.: 15/874,009

(22) Filed: Jan. 18, 2018

Related U.S. Application Data

(63) Continuation of application No. 15/627,855, filed on Jun. 20, 2017, now Pat. No. 9,906,506, which is a continuation of application No. 15/381,052, filed on Dec. 15, 2016, now Pat. No. 9,716,714, which is a continuation of application No. 14/749,575, filed on Jun. 24, 2015, now Pat. No. 9,584,530.

(60) Provisional application No. 62/018,505, filed on Jun. 27, 2014.

(51) Int. Cl.
*H04L 29/06* (2006.01)
*H04L 9/32* (2006.01)

(52) U.S. Cl.
CPC ........ *H04L 63/0442* (2013.01); *H04L 9/3242* (2013.01); *H04L 63/061* (2013.01); *H04L 63/062* (2013.01)

(58) Field of Classification Search
None
See application file for complete search history.

(56) References Cited

U.S. PATENT DOCUMENTS

| 6,442,686 | B1 * | 8/2002 | McArdle | H04L 51/12 |
| | | | | 713/151 |
| 6,601,172 | B1 | 7/2003 | Epstein | |
| 6,886,095 | B1 * | 4/2005 | Hind | H04L 63/0823 |
| | | | | 713/168 |
| 7,017,041 | B2 * | 3/2006 | Sandhu | H04L 9/14 |
| | | | | 380/30 |
| 7,243,231 | B2 | 7/2007 | Ellison et al. | |
| 7,657,037 | B2 | 2/2010 | Callas | |
| 7,730,309 | B2 | 6/2010 | Zimmermann | |

(Continued)

OTHER PUBLICATIONS

Shiravi, Hadi; Shiravi, Ali; Ghorbani, Ali A. A Survey of Visualization Systems for Network Security. IEEE Transactions on Visualization and Computer Graphics. vol. 18, Issue: 8. Pub. Date: 2012. https://ieeexplore.ieee.org/stamp/stamp.jsp?tp=&arnumber=6007132.*

(Continued)

*Primary Examiner* — Jeremiah Avery
(74) *Attorney, Agent, or Firm* — Christian LaForgia

(57) ABSTRACT

A variety of techniques for performing identity verification are disclosed. As one example, a verification request is received from a remote user. The verification request pertains to a cryptographic key. In response to receiving a confirmation from a local user of the local device, a verification process is initiated. A result of the verification process is transmitted to the remote user. As a second example, a verification request can be received at the local device, from a local user of the device. A verification process with respect to the local user is initiated, and a result of the verification process is transmitted to a remote user that is different from the local user.

17 Claims, 31 Drawing Sheets

(56) References Cited

U.S. PATENT DOCUMENTS

| | | | |
|---|---|---|---|
| 8,171,534 B2* | 5/2012 | Chan | H04L 9/3236 713/150 |
| 8,327,422 B1* | 12/2012 | Friedman | G06F 21/44 713/168 |
| 8,433,914 B1 | 4/2013 | Philpott et al. | |
| 8,726,369 B1 | 5/2014 | Emigh | |
| 8,925,109 B2 | 12/2014 | Agrawal et al. | |
| 9,419,852 B1* | 8/2016 | Heller | H04L 29/08576 |
| 2002/0016913 A1* | 2/2002 | Wheeler | G06F 21/32 713/170 |
| 2002/0104006 A1* | 8/2002 | Boate | H04L 63/0853 713/186 |
| 2004/0123113 A1* | 6/2004 | Mathiassen | B60R 25/252 713/185 |
| 2005/0193199 A1 | 9/2005 | Asokan et al. | |
| 2006/0020796 A1 | 1/2006 | Aura et al. | |
| 2006/0020812 A1 | 1/2006 | Steinberg et al. | |
| 2006/0090073 A1* | 4/2006 | Steinberg | G06F 21/31 713/170 |
| 2006/0147000 A1 | 7/2006 | Novi | |
| 2007/0136573 A1 | 6/2007 | Steinberg | |
| 2008/0077686 A1 | 3/2008 | Subhraveti | |
| 2008/0137848 A1 | 6/2008 | Kocher et al. | |
| 2009/0089589 A1 | 4/2009 | Tobita | |
| 2009/0106551 A1* | 4/2009 | Boren | H04L 9/0822 713/158 |
| 2010/0017602 A1* | 1/2010 | Bussard | H04L 9/0844 713/168 |
| 2010/0205667 A1 | 8/2010 | Anderson et al. | |
| 2012/0072733 A1 | 3/2012 | Bennett et al. | |
| 2013/0227286 A1* | 8/2013 | Brisson | H04L 63/062 713/168 |
| 2014/0206285 A1 | 7/2014 | Jance et al. | |
| 2014/0304515 A1 | 10/2014 | Feuerman et al. | |
| 2014/0379584 A1 | 12/2014 | Ward | |
| 2015/0195264 A1 | 7/2015 | Finlayson | |
| 2015/0237048 A1 | 8/2015 | Sun et al. | |
| 2016/0191513 A1 | 6/2016 | Tomlinson et al. | |

OTHER PUBLICATIONS

Zhang, Ran; Qian, Depei; Chen, Heng; Wu, Weiguo. Collaborative Intrusion Detection Based on Coordination Agent. Proceedings of the Fourth International Conference on Parallel and Distributed Computing, Applications and Technologies, 2003. Pub. Date: 2003. https://ieeexplore.ieee.org/stamp/stamp.jsp?tp=&arnumber=1236282.*

Lee, Keun-Ho; Hwang, Chong-Sun. TAKCS: Threshold Authentication Key Configuration Scheme for Multilayer Cluster in Mobile Ad Hoc Networks. The 8th International Conference Advanced Communication Technology, 2006. ICACT 2006. Pub. Date: 2006. https://ieeexplore.ieee.org/stamp/stamp.jsp?tp=&arnumber=1625620.*

Chung-Ping Wu et al. "Fragile Speech Watermarking for Content Integrity Verification." 2002 IEEE International Symposium on Circuits and Systems, ISCAS 2002.

de Carvalho et al. Video Steganography for Confidential Documents: Integrity, Privacy, and Version Control. Proceedings of the 26th Annual ACM International Conference on Design of Communications. SIGDOC '08. Pub. Date: 2008.

Juan Ramon Troncos-Pastoriza et al. "Fully Private Noninteractive Face Verification" IEEE Transactions on Information Forensics and Security. vol. 8, Issue: 7. Pub. Date: 2013.

Kocher et al. Security as a New Dimension in Embedded System Design. Proceedings of the 41st Annual Design Automation Conference. DAC '04. Pub Date: 2004 pp. 753-760.

Moscaritolo et al. "Silent Circle Instant Messaging Protocol Protocol Specification." Silent Circle Engineering, Version 1.0. Dec. 5, 2012.

Oikonomidis et al. "Identity Based Protocols for Secure Electronic Content Distribution and Licensing Proceedings of the Fourth International Conference on Web Delivering of Music." Wedelmusic 2004. http://ieeexplore.ieee.org/stamp/stamp.jsp?arnumber=1358105.

Pei et al. "An Intelligent Digital Content Protection Framework between Home Network Receiver Devices" 2006 International Conference on Computational Intelligence and Security. http://ieeexplore.ieee.org/stamp/stamp.jsp?arnumber=4076116.

Roman V. Yampoiskiy. "Mimicry Attack on Strategy-Based Behavioral Biometric." Fifth International Conference on Information Technology: New Generations, 2008. ITNG 2008. http://ieeexplore.ieee.org/stamp/stamp.jsp?arnumber=4492601.

Young Sam Kim et al. "SRS-Based Automatic Secure Device Pairing on Audio Channels." 2010 International conference for Internet Technology and Secured Transactions (ICITST).

\* cited by examiner

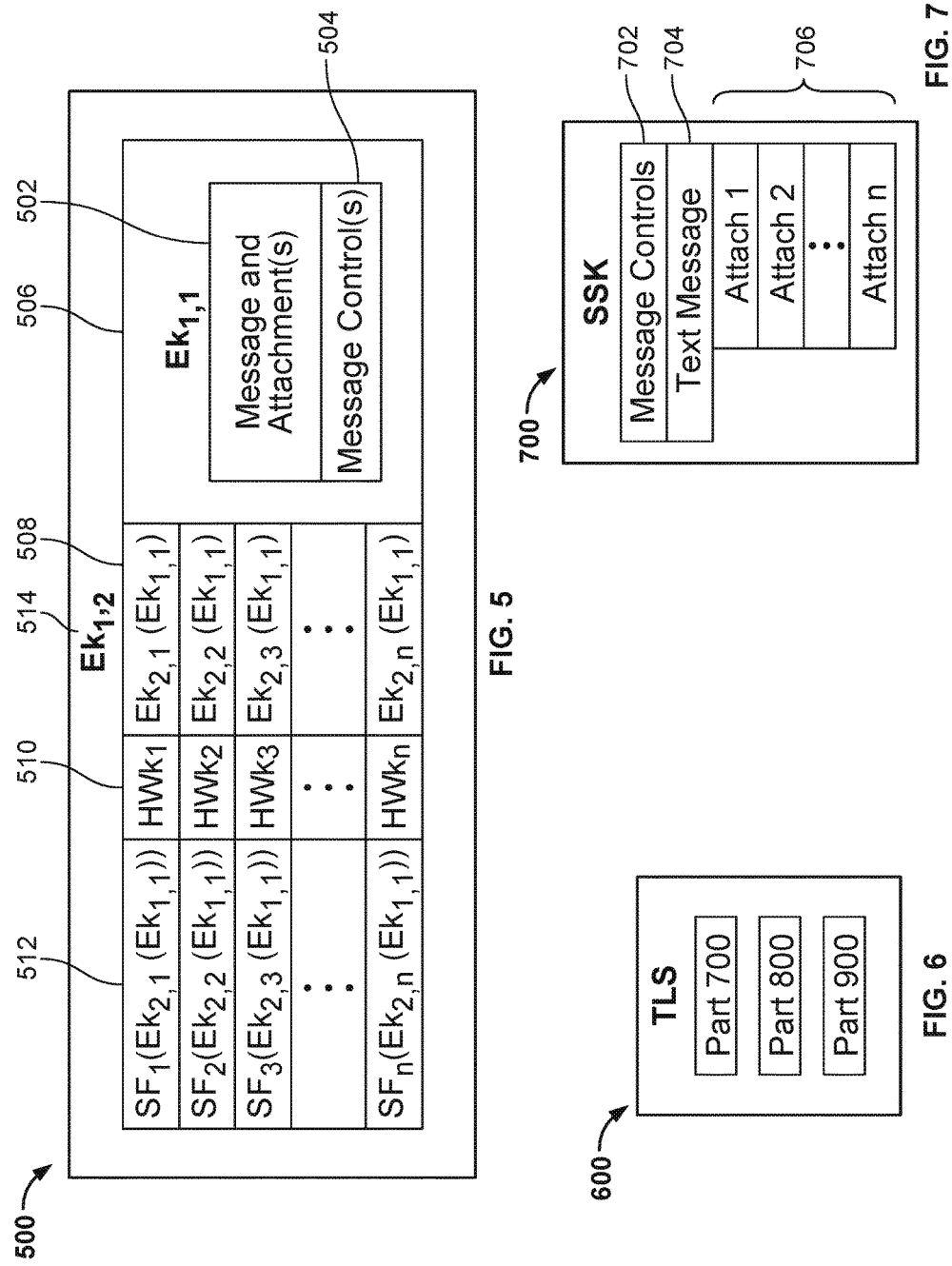

… (US 10,084,761 B1)

IN-BAND IDENTITY VERIFICATION AND MAN-IN-THE-MIDDLE DEFENSE

CROSS REFERENCE TO OTHER APPLICATIONS

This application is a continuation of co-pending U.S. patent application Ser. No. 15/627,855, filed on Jun. 20, 2017 and entitled "IN-BAND IDENTITY VERIFICATION AND MAN-IN-THE MIDDLE DEFENSE," which is a continuation of U.S. patent application Ser. No. 15/381,052, filed on Dec. 15, 2016 and entitled "IN-BAND IDENTITY VERIFICATION AND MAN-IN-THE MIDDLE DEFENSE," which issued as U.S. Pat. No. 9,716,714 on Jul. 25, 2017, which is a continuation of U.S. patent application Ser. No. 14/749,575, filed on Jun. 24, 2015 and entitled "IN-BAND IDENTITY VERIFICATION AND MAN-IN-THE MIDDLE DEFENSE," which issued as U.S. Pat. No. 9,584,530 on Feb. 28, 2017, which claims priority to U.S. Provisional Patent Application No. 62/018,505, filed on Jun. 27, 2014 and entitled "IN-BAND IDENTITY VERIFICATION AND MAN-IN-THE-MIDDLE DEFENSE," the entireties of which are herein incorporated herein by reference.

BACKGROUND OF THE INVENTION

Users of electronic devices increasingly desire to communicate privately and securely with one another. Unfortunately, existing approaches to securing communications can be difficult and/or cumbersome to use. As one example, some approaches to data security make use of digital certificates or keys, or pre-shared passwords, which can be tedious to manage. Further, existing approaches are often susceptible to interception (e.g., eavesdropping and man-in-the middle attacks), forensic analysis, and impersonation. Improvements to digital communication techniques are therefore desirable.

BRIEF DESCRIPTION OF THE DRAWINGS

Various embodiments of the invention are disclosed in the following detailed description and the accompanying drawings.

FIG. 5 illustrates an example of a digital security bubble.

FIG. 6 illustrates an example of a digital security bubble.

FIG. 7 illustrates an example of a portion of a digital security bubble.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
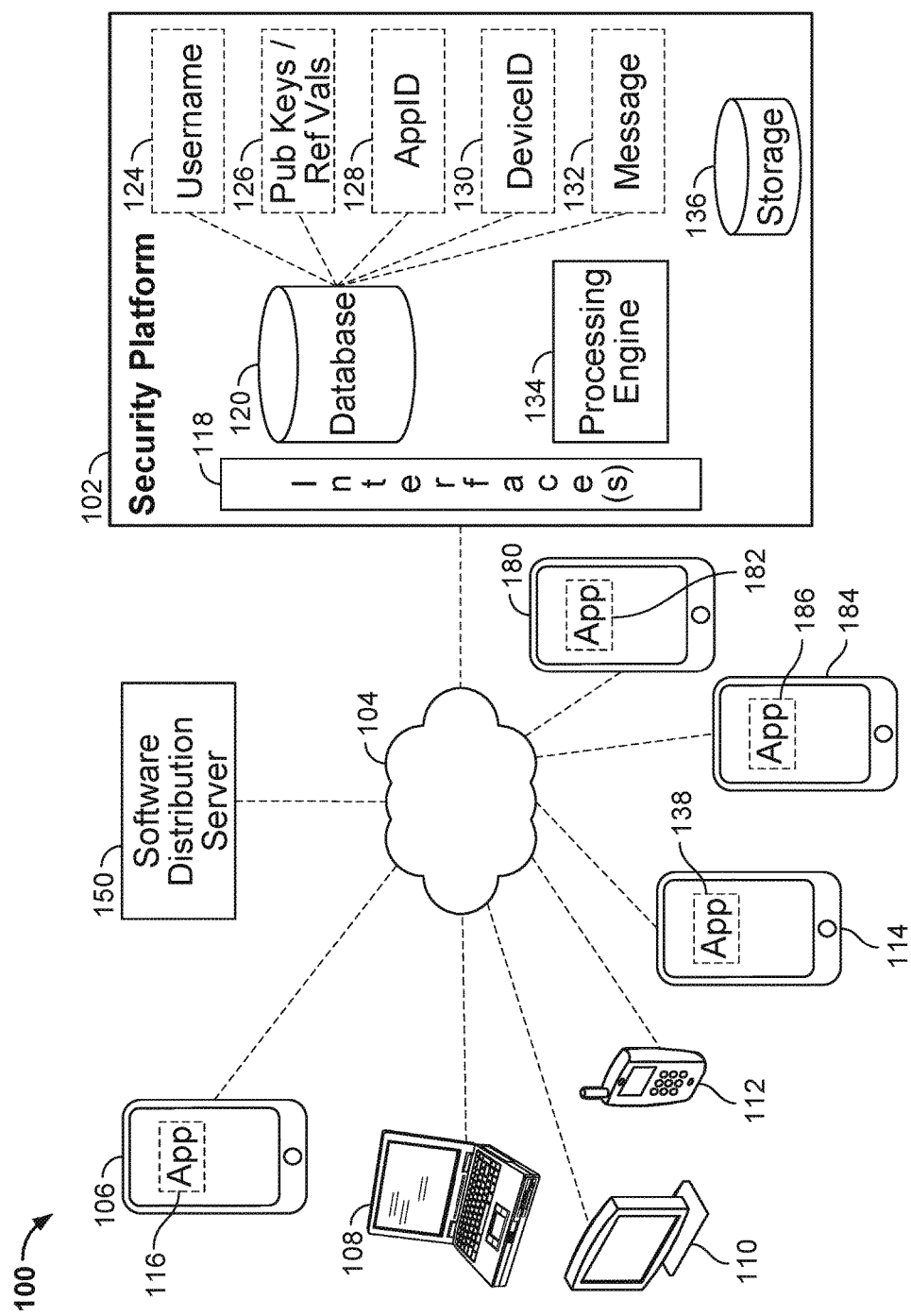
FIG. 1 illustrates an embodiment of an environment in which the exchange of secure communications is facilitated by a security platform.

FIG. 1 illustrates an embodiment of an environment in which the exchange of secure communications is facilitated by a security platform (e.g., security platform 102). In the environment shown in FIG. 1, a "digital security bubble" (DSB), described in more detail below, encapsulates or is otherwise provided around a message. The DSB allows information such as encryption information, hardware binding information, message security controls, and decryption information—for multiple recipients (as applicable)—to securely travel with the message. Further, the DSB provides cross-platform support. For example, techniques described herein can be deployed on a variety of operating systems (e.g., Linux, iOS, and Windows), on a variety of smart phone platforms (e.g., iPhone, Android, Windows, Blackberry, etc.), and on a variety of device types (e.g., mobile smart phones, tablets, laptops, desktops, etc.). Using techniques described herein, only intended accounts on intended devices are able to decrypt the messages. Thus, for example, the security platform is unable to decrypt messages. Users of embodiments of platform 102 (or administrators associated with those users, as applicable) can control who is cable of communicating with them, using privacy lists (described in more detail below, e.g., in Section H). As will further be described in more detail below, using the techniques described herein, message participants can maintain a forward secret secure messaging channel, whether communicating synchronously (e.g., where all participants are online or otherwise able to communicate with platform 102) and asynchronously (e.g., where at least one participant is offline or otherwise not in communication with platform 102).

Users of client devices, such as client devices 106-114 communicate securely with one another using techniques described herein. As shown in FIG. 1, client devices include personal computers (110), laptop computers (108), tablets (106), and mobile telephony devices (112, 114, 180, 184). Some client devices, e.g., tablet device 106, make use of techniques described herein via a messaging application (also referred to as an "app") obtained from a software distribution server 150. Examples of software distribution servers (which can comprise a single server or multiple servers working in cooperation) include app stores (e.g., provided by Apple, Google, Blackberry, Microsoft, Amazon, and/or other entities) and other webservers offering app (and/or other software) downloads. Client devices can also make use of a web interface (e.g., provided by platform 102) instead of or in addition to a dedicated messaging application installed on the device. Other types of devices not depicted in FIG. 1 can also be used in conjunction with the techniques described herein, such as game consoles, camera/video recorders, video players (e.g., incorporating DVD, Blu-ray, Red Laser, Optical, and/or streaming technologies) and other network-connected appliances, as applicable.

Communications are exchanged via one or more networks (depicted collectively in FIG. 1 as network cloud 104). Such networks can include wired, wireless, cellular, and satellite networks. And, such networks can be closed/private networks, as well open networks (e.g., the Internet). Further, as used herein, "communications" and "messages" can take a variety of forms, including: text messages, documents, audiovisual files, SMSes, and voice and video calls. Further, in addition to personal, business, or other types of conversations, the content can pertain to electronic transactions such as credit card security, password protection, directories, and storage drive protection, video on demand security, online gaming, gambling, electronic distribution of music, videos, documents, online learning systems, databases, cloud storage and cloud environments, bank transactions, voting processes, military communications, security of medical records, communication between medically implanted devices and doctors, etc. As will be described in more detail below, the exchange of communications is facilitated by security platform 102 (or embodiments thereof, as applicable).

As will be described in more detail below, a variety of entities can operate embodiments of platform 102. Further, multiple embodiments of platform 102 can exist simultaneously in an environment (with those multiple embodiments operated by a single entity, or different entities) with the techniques described herein adapted as applicable. For example, platform 102 can be operated by a non-profit organization (or an individual, a company, or any other appropriate type of entity or set of entities) for use by the general public (e.g., with arbitrary members of the public able to use platform 102 to exchange communications). As another example, an enterprise organization can operate an embodiment of platform 102 exclusively for use by the employees of the enterprise (and, as applicable, other individuals, such as vendors). As yet another example, a company (or other entity or entities) can operate one or multiple instances of platform 102 on behalf of multiple organizations, such as small business or companies, schools, charitable organizations, etc.

A. Installation/Initialization/Registration

Suppose a user of client device 106 (hereinafter referred to as "Alice") would like to send a secure message to her friend, Bob (a user of client device 114) in accordance with techniques described herein. In some embodiments, in order to send a message to Bob, Alice first obtains a copy of a messaging application suitable for her device. For example, if Alice's tablet device runs iOS, she could obtain an "app" for her tablet from the Apple App Store (an example of software distribution server 106). Bob similarly obtains an appropriate application suitable for his client device 114 (e.g., an Android-based smartphone) from an appropriate location (e.g., the Google Play store or Amazon Appstore). In some embodiments, client devices make use of a web-based application (e.g., made available by platform 102 through interface 118), instead of, or in addition to, a dedicated installed application.

In embodiments where platform 102 is operated on behalf of specific groups of individuals (e.g., on behalf of employees of a company, students/teachers at a school, company stockholders, members of a club, premium customers, etc.), the app can be obtained from a publicly accessible software distribution server as Alice and Bob do above (e.g., from the Google Play store), can be obtained from a privately operated software distribution server (e.g., made available only to company-issued devices or devices otherwise authorized to communicate with the private server), can be provisioned by support personnel associated with the group (e.g., by being directly installed by the support personnel or included in a device image), etc., as applicable. For example, suppose an embodiment of platform 102 is operated by ACME University on behalf of its students and faculty/staff. As mentioned above, the university can itself operate an embodiment of platform 102, or can contract with a third party to make available the embodiment of platform 102 for university users. Freshmen (and other new students/employees, as applicable) at ACME University can be provided with instructions for downloading and installing an ACME University-specific embodiment of the secure messaging application from a university server in conjunction with their new student orientation. As another example, new employees of Beta Corporation can be issued company phones (and/or other devices such as laptops) with an embodiment of the secure messaging application pre-installed and pre-configured by support personnel for Beta Corporation (e.g., where Beta Corporation operates an embodiment of platform 102 on behalf of its employees and business partners). As yet another example, business partners of Beta Corporation (e.g., vendors) can be provided with instructions for provisioning a Beta Corporation-specific embodiment of the secure messaging application via email, or via a website. And, the Beta Corporation-specific embodiment of the secure messaging application can be made available via email, a website, or any other appropriate mechanism.

Figure 2A:
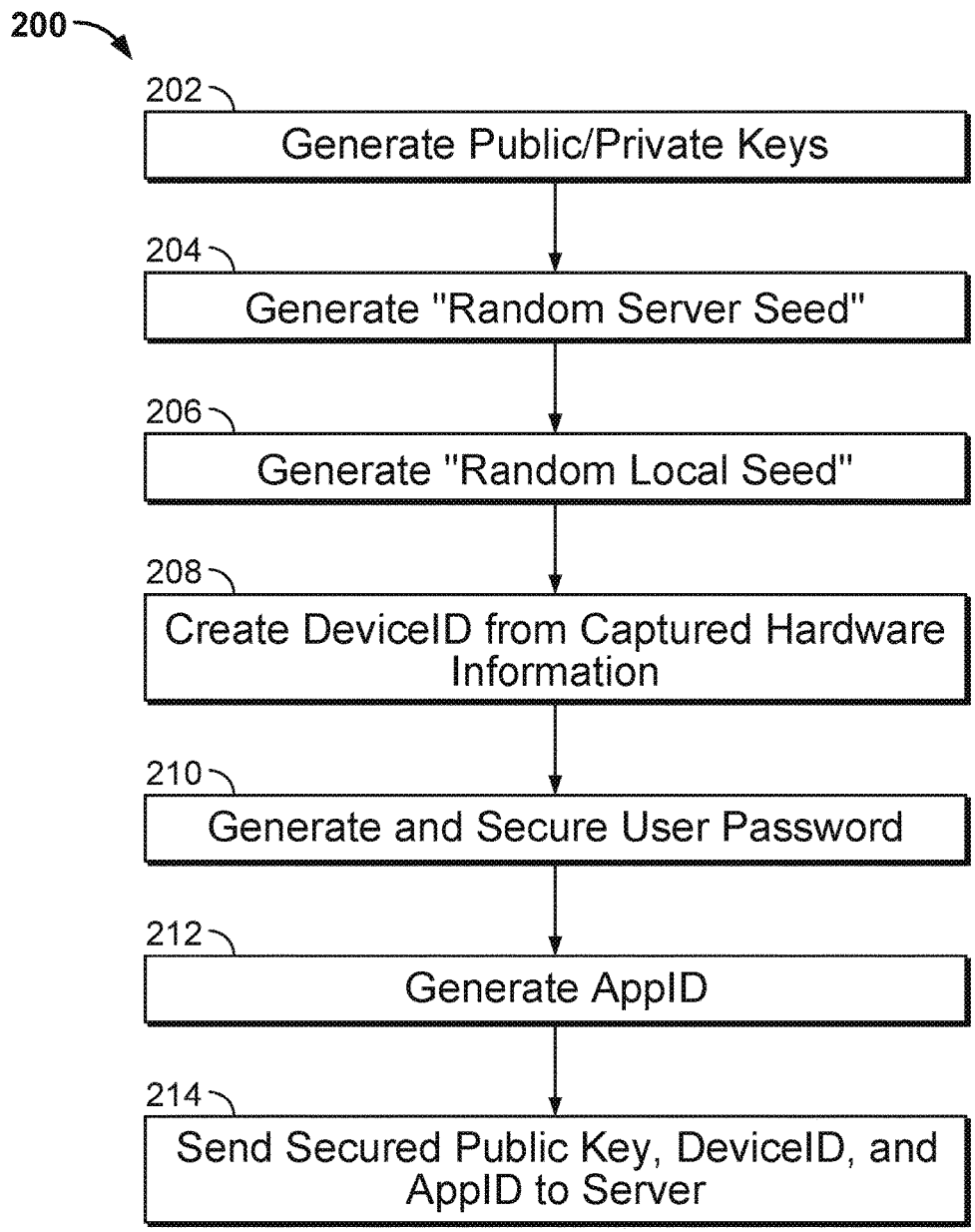
FIG. 2A illustrates an embodiment of an installation and registration process.
Figure 2B:
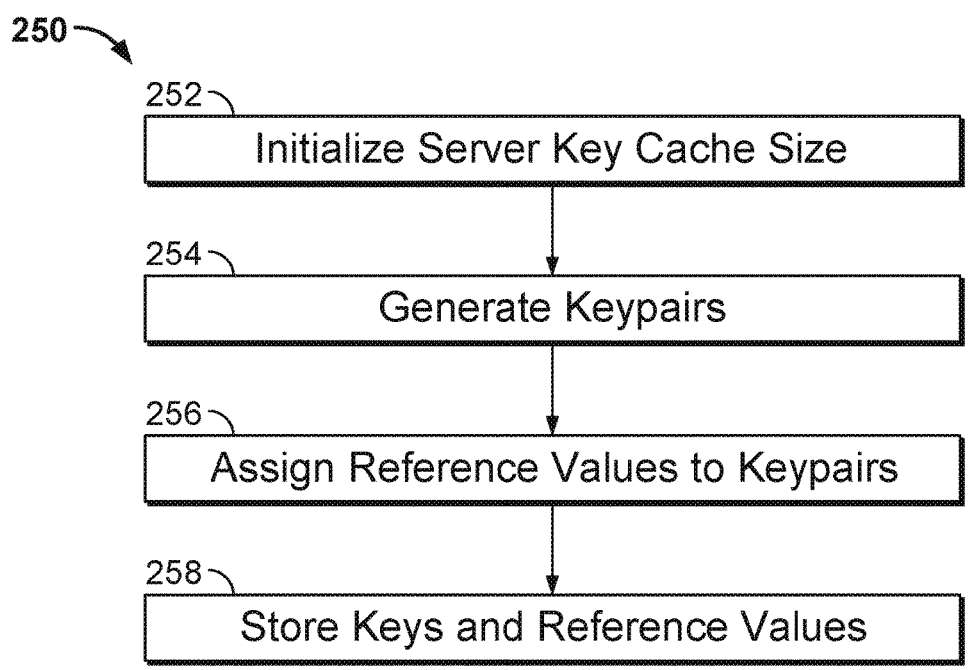
FIG. 2B illustrates an embodiment of a process for generating a pool of keypairs.

Returning to the example of Alice (a member of the public, using an embodiment of platform 102 made available to the public), once Alice's tablet 106 has obtained a copy of the secure messaging app, the app is installed, and Alice is able to register for an account. An instance of a messaging app usable in conjunction with the techniques described herein is depicted in FIG. 1 as app 116 (installed on device 106). Examples of events that can occur during an installation/initialization/registration process (200) are illustrated in FIGS. 2A and 2B and will now be described. While the events will be described in one order, events can also be performed in other orders and/or in parallel (instead of in sequence) in other embodiments. Further, various events can be added or omitted, in some embodiments, as applicable. For example, where an embodiment of platform 102 is made available by an enterprise for use by its employees (or a school on behalf of its student/staff/faculty, etc.), account creation and initialization may at least partially be performed by support personnel (and/or may be performed at least partially in an automated manner based on a new employee/member workflow), instead of being performed by an end user. As a further example, administrators (e.g., in the school or enterprise scenarios) can pre-configure privacy list information (described in more detail below) on behalf of users.

In some embodiments, process 200 is performed on a client device, such as Alice's client device 106. The process begins at 202 when a pool of public/private keypairs for the application is generated, on client device 106 (e.g., using RSA, ECDH, or any other appropriate asymmetric encryption algorithms). As one example, the keypairs can be generated using Eliptic Curve Algorithm with Diffie Helman Key Exchange (ECDH). Other cryptographic standards can also be used, such as RSA. In some embodiments, the keypairs are randomly seeded. As will be described in more detail below, each message Alice sends (whether to Bob or anyone else) can be encrypted with a unique, random key that is used only once then destroyed forensically by Alice (the sender's) device. The forensic destruction ensures that the deleted keys cannot be recovered from Alice's device, even via digital forensics methods.

FIG. 2B illustrates an embodiment of a process for generating a plurality of public/private keypairs. In some embodiments, process 250 is performed on a client device (such as client device 106) as portion 202 of process 200. Process 250 begins at 252 when the pool size associated with the client device is initialized. As one example, a default pool size of fifty keys is received as a parameter from platform 102 by application 116. The pool size can also be encoded into application 116 or otherwise provided to device 106 (e.g., configured via an enterprise administrator, where platform 102 is operated on behalf of an enterprise) without requiring the server to transmit the initial pool size. As will be explained in more detail below, the pool size associated with a device can be dynamically adjusted, for example, such that a device (e.g., of a heavy user that is frequently offline) that initially has a pool size of 50 keys can have the size adjusted upward to a pool size of 200 keys (or more).

At 254, a pool of keys (i.e., a number of keypairs equal to the size initialized at 252) is generated on client device 106. As mentioned above, the keypairs can be generated using Eliptic Curve Algorithm with Diffie Helman Key Exchange (ECDH). Other cryptographic standards can also be used, such as RSA.

At 256, a reference value is assigned for each of the respective keypairs. As one example, suppose fifty keypairs are generated at portion 254 of process 250. At 256, fifty respective reference values are assigned to each of the respective keypairs. The reference values will be used to distinguish the various keys in the pool of keys from one another and can be assigned to the keypairs in a variety of ways. As one example, a six digit random number can be generated by device 106 as the first reference value for the first keypair, and each subsequent reference value can be selected as an increment of the first reference value. As another example, every reference value can be randomly selected. Other schemes for selecting/assigning reference values can be employed at 256 as applicable.

At 258, the private keys and reference values are stored (e.g., in a secure database residing on device 106). As will be described in more detail below, the corresponding public keys will be transmitted to platform 102 (along with the associated reference values) and platform 102 will designate one of the public keys in the pool as a reserve key.

Returning to FIG. 2A, at 204, a "random server seed" is generated, and at 206, a "random local seed" is generated. The seeds are used in conjunction with cryptographic key generation, and in some embodiments, the seeds are determined based on captured hardware information (described in more detail below).

At 208, a device identifier ("deviceID") is created from captured hardware information. Examples of captured hardware information include: hard drive identifiers, motherboard identifiers, CPU identifiers, and MAC addresses for wireless, LAN, Bluetooth, and optical cards. Combinations of information pertaining to device characteristics, such as RAM, CACHE, controller cards, etc., can also be used to uniquely identify the device. Some, or all, of the captured hardware information is run through a cryptographic hash algorithm such as SHA-256, to create a unique deviceID for the device. The captured hardware information can also be used for other purposes, such as to seed cryptographic functions.

At 210, Alice is asked, via an interface provided by app 116, to supply a desired username. Alice enters "Alice" into the interface. A determination is made as to whether the username is available. As one example, app 116 can supply a cryptographic hash of "Alice" to platform 102 for checking. If platform 102 does not already have a record for that hash, the username "Alice" is available for Alice to use. If platform 102 already has a record of that hash, Alice is instructed by the interface to pick an alternate username.

Once Alice has selected an available username, she is asked to supply a password. As mentioned above, in some embodiments, portions of process 200 may be omitted (or performed by other entities, as applicable). For example, where a university student at ACME University is getting set up to use an ACME University-specific embodiment of platform 102, the user's name may be preselected or otherwise issued by the University, rather than being selected by the user.

At 212, an application identifier ("appID") is created. The appID is a unique identifier for the particular installation of the messaging app. If Alice installs the messaging app on multiple devices, each of her devices will have its own unique appID. (And, each of her devices will also have its own unique deviceID.) In some embodiments, the appID is created by hashing Alice's selected password and other information such as device information.

Finally, at 214 Alice's public keys (and reference values), deviceID, and appID are sent to platform 102 in a secure manner. As one example, in some embodiments app 116 is configured to communicate with platform 102 via TLS.

At the conclusion of process 200, Alice is ready to send and receive secure communications.

As mentioned above, alternate versions of processes 200 and/or 250 can be used in accordance with the techniques described herein. As one example, username/password selection (210) can be performed prior to other portions of process 200 (and can be performed by an entity other than the end user of the messaging application, e.g., where an employer determines a username for an employee). As another example, the random server seed generation (204) and random local seed generation (206) can be performed prior to the keypair generation (202), e.g., with the local seed being used in conjunction with the generating of the keypairs. As yet another example, portions of processes 200 and/or 250 can be combined and/or omitted as applicable. For example, instead of generating a pool of fifty key pairs (254), assigning reference values to the pool as a batch operation (256) and storing the keys/values as a batch operation (258), fifty iterations of a process that generates a key pair, assigns a reference value, and stores the information can be performed.

B. Security Platform

As mentioned above, security platform 102 is configured to facilitate the exchange of communications (e.g., among any/all of client devices 106-114). Also as mentioned above, platform 102 can be operated by a variety of entities on behalf of a variety of end users. For example, one embodiment of platform 102 can be made available to members of the public, whether as a public service, or for a fee. As another example, another embodiment of platform 102 can be made available by a business, by a school, by a charitable organization, etc., and its use limited to its employees/students/members, etc., as applicable. Additional detail regarding various aspects of embodiments of platform 102 will now be provided.

Security platform 102 includes one or more interface(s) 118 for communicating with client devices, such as client devices 106-114. As one example, platform 102 provides an application programming interface (API) configured to communicate with apps installed on client devices, such as app 116, app 138, app 182, and app 186. Platform 102 can also provide other types of interfaces, such as a web interface, or stand alone software programs for desktops and laptops, running on various Operating Systems (OSes). The web interface can allow users of client devices such as client devices 108 and 110 to exchange messages securely (whether with one another or other users), without the need for a separately installed messaging application. The stand alone software program allows users to exchange secure messages via software that is downloaded by each user. As will be discussed in more detail below (e.g., in Section G), in various embodiments, platform 102 makes available (e.g., via one or more interface(s) 118) a master clock time. The master clock time can be used, in various embodiments, to enforce secure time-to-live (TTL) values of messages. The TTL values can be used to enforce (e.g., on behalf of a message sender) time constraints on message access (e.g., by a recipient).

Security platform 102 also includes a database 120. Included in database 120 is a record for each user of platform 102. Each record has associated with it information such as the user's public key pool and associated reference values, deviceID(s), appID(s), privacy mode and privacy list entries, and messages. As shown in FIG. 1, database 120 is relational and stores information in a variety of tables, including a table of hashed usernames (124), a table of public keys and reference values (126), a table of deviceIDs (128), a table of appIDs (130), and a table of messages (132). Other techniques can also be used to store the information used by platform 102. For example, messages can be stored in a separate storage 136 instead of being stored within database 120. As will be described in more detail below, additional information can be securely stored on platform 102, whether in database 120 or another appropriate location, such as user verification information, and user verification settings, described in more detail below.

Finally, security platform 102 includes a processing engine 134 which performs a variety of tasks, including interacting with database 120 on behalf of interface(s) 118. As will be described in more detail below, one task performed by platform 102 (e.g., by processing engine 134) is to designate one of the keys in the pool of public keys (e.g., received from Alice at the conclusion of portion 214 of process 200) as a "reserve" key. Another task performed by platform 102 (e.g., processing engine 134) is to facilitate the addition of new keys to a user's key pool as the keys are used. Yet another task performed by platform 102 (e.g., processing engine 134) is to dynamically adjust the size of a user's key pool as needed. Yet another task performed by platform 102, in various embodiments, is confirming whether mutual privacy settings permit a given user to communicate with another user (described in more detail in Section H), and providing keys for communications only where privacy settings permit.

The embodiment of platform 102 depicted in FIG. 1 comprises standard commercially available server hardware (e.g., having a multi-core processor(s), 8G+ of RAM, gigabit network interface adaptor(s), and hard drive(s)) running a typical server-class operating system (e.g., Linux). In various embodiments, platform 102 is implemented across a scalable infrastructure comprising multiple such servers, solid state drives, and/or other applicable high-performance hardware.

Whenever platform 102 is described as performing a task, either a single component or a subset of components or all components of platform 102 may cooperate to perform the task. Similarly, whenever a component of platform 102 is described as performing a task, a subcomponent may perform the task and/or the component may perform the task in conjunction with other components.

C. Sending DSB Secured Messages

Returning back to Alice's desire to send a message to Bob: at the conclusion of Section A above, Alice has successfully registered her username ("Alice") with security platform 102. And, Bob is also a user of platform 102. Suppose Alice would like to send a message to Bob. She starts app 116 and is presented with an interface that includes a "compose" option. Alice selects the compose option and is presented with a message composition interface.

Figure 3:
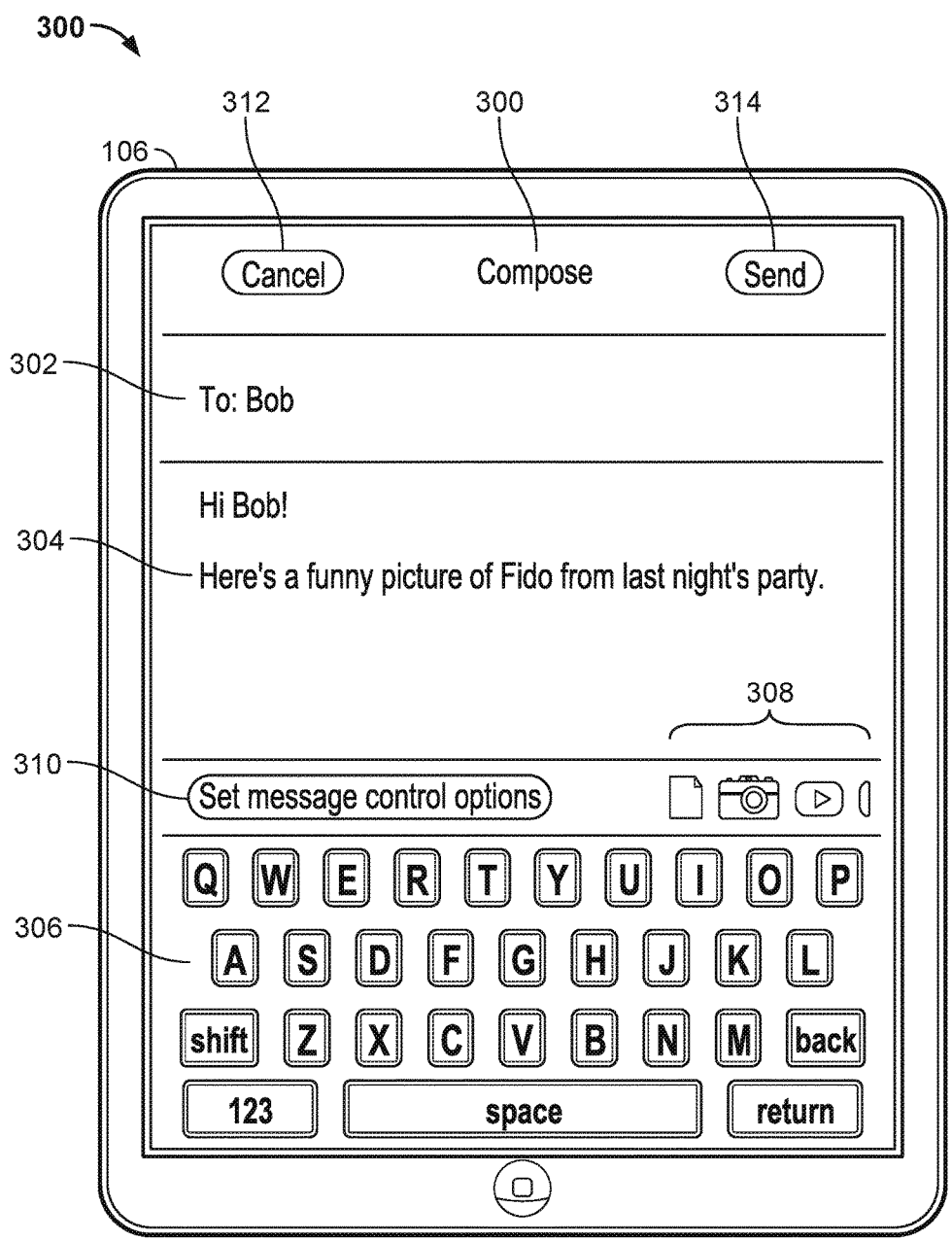
FIG. 3 illustrates an example of an interface.

An example message composition interface is shown in FIG. 3. In particular, FIG. 3 depicts interface 300 as rendered on an example tablet device 106, connected to the Internet via an appropriate connection, such as: 3G, 4G or higher cellular connection, WiFi, satellite, wireless or wired LANs, Bluetooth, etc. Tablet device 106 includes a touchscreen. An on-screen keyboard is provided for Alice in region 306. Alice can enter the usernames of one or more recipients in region 302. As will be described in more detail below (e.g., in Section H), in some embodiments, any names that Alice enters into region 302 are checked against Alice's privacy list (and the privacy lists of the recipients) to confirm that privacy settings allow Alice to message the recipient(s). As will also be described in more detail below (e.g., in Section I), additional checks can be performed, as applicable, such as where Alice has turned on advanced identity verification. She can enter message text in region 304. Alice can optionally add attachments by interacting with buttons shown in region 308. Examples of attachments include, but are not limited to: documents, pictures, and audiovisual clips. By selecting button 310, Alice can specify various message control options, such as: the lifetime/expiration of the message (the enforcement of which is described in more detail below in Section G); on which device(s) it can be unencrypted/read; and sharing, saving, forwarding, recalling, and deleting options.

If Alice is satisfied with her message, she can send it to Bob by clicking the send button (314). If she wishes to cancel out of composing the message, she can click the cancel button (312). Suppose Alice clicks send button (314) after composing the message shown in interface 300. An example of the events that occur, in some embodiments, in conjunction with Alice sending a message is illustrated as process 400 in FIG. 4 and will now be described.

Figure 4:
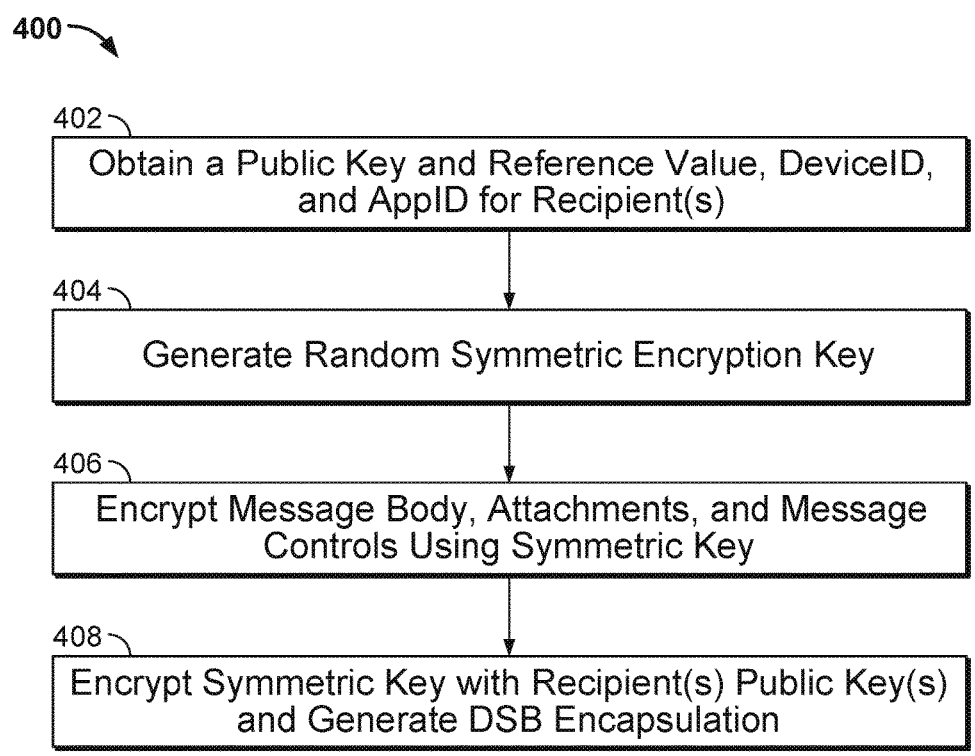
FIG. 4 illustrates an example of a message sending process.

FIG. 4 illustrates an example of a process for sending a DSB-secured message. In some embodiments, process 400 is performed on a client device, such as Alice's client device 106. The process begins at 402 when a particular public key (from the user's pool of public keys) and associated reference value, deviceID, and appID of a recipient are obtained from platform 102. As will be described in more detail below (e.g., in Section H), in some embodiments, the recipient's public key is only obtained after platform 102 confirms that the sending of a message by the sender to the recipient is mutually permitted after checking one or more privacy lists. The recipient's particular public key, deviceID and appID are used in the encryption of the symmetric key used to encrypt data, and in the DSB encapsulation of the message for the hardware/appID binding of the message. As one example, app 116 can request the information from platform 102 via an API (e.g., interface 118). In some embodiments, the information is retrieved when Alice enters the recipient's name into region 302. In other embodiments, the information is retrieved when Alice clicks send button 314, or at any other appropriate time (e.g., while she is composing a message). In the example shown in FIG. 3, Alice is only sending a message to Bob. If she also desires to send the message to other recipients, she can enter their names in region 302 as well, and one of their respective public keys (again selected from their respective pools of public keys) and associated reference values, deviceIDs, and appIDs will also be retrieved at 402 (after any applicable privacy checks have been performed).

At 404, a random symmetric encryption key is generated (e.g., by app 116 on device 106). As one example, the symmetric key is an AES 256 bit key. At 406, the symmetric encryption key is used to encrypt the message body, any attachments, and any message control options. In some embodiments, Alice's own information (e.g., public key(s) and associated reference value(s), deviceID(s), and appID(s)) is included in the DSB as well. Finally, at 408, the symmetric key is encrypted with the particular public key of each recipient (obtained from the pool of public keys). A DSB encapsulation is then generated, and contains the aforementioned components and reference values of the public keys used to encrypt the symmetric key. Examples of the DSB format are provided in Section D below.

In some cases, a user may own multiple devices. For example, Bob may be the owner of devices 114 and 112, both of which are configured with secure messaging apps. Each of Bob's installations will have its own deviceID and appID. When the DSB is created, each of Bob's devices will be considered a separate device under the same username account.

The generated DSB is securely transmitted to platform 102 (e.g., by being encrypted with a symmetric key shared by the app and platform 102, and also encapsulated by TLS as an additional security layer). Irrespective of how many recipients Alice designates for her message (and, e.g., how many recipients there are or how many devices Bob has), only one DSB will be created and transmitted to platform 102. Upon receipt of the DSB, processing engine 134 opens the DSB and determines the recipients of the message. Specifically, the processing engine 134 performs a match against the deviceIDs (in a cryptographic hash and camouflaged representation) included in the DSB and the deviceIDs stored in database 120 as well as the username (in a cryptographic hash and camouflaged representation) in the DSB and the ones stored in the database 120. A cryptographic hash and camouflaged representation means that the hash algorithm (i.e. SHA256) that is used for the deviceID, username, and appID values, is further camouflaged, in some embodiments, by taking multiple hashes of the result values (i.e. multiple rounds of SHA256 of the previous SHA256 value—i.e. SHA(SHA(SHA(SHA . . . )))). Processing engine 134 also creates an entry for the received DSB in message table 132 and notifies the recipient(s) that a new message is available. In various embodiments, other actions are also performed by platform 102 with respect to the DSB. As one example, platform 102 can be configured to remove the DSB as soon as the recipient successfully downloads it. As another example, platform 102 can enforce an expiration time (e.g., seven days) by which, if the DSB has not been accessed by the recipient, the DSB is deleted. Where multiple recipients are included in a DSB, platform 102 can be configured to keep track of which recipients have downloaded a copy of the DSB, and remove it once all recipients have successfully downloaded it (or an expiration event has occurred).

D. DSB Examples

FIG. 5 illustrates an example of a digital security bubble (DSB). DSB 500 is an example of output that can be generated by app 116 as a result of executing process 400. In the example shown, DSB 500 includes a message and optional attachments (502), and one or more message controls (504) encrypted with a key $Ek_{1,1}$ (encrypted portion 506). In some embodiments, key $Ek_{1,1}$ is generated by app 116 at portion 404 of process 400. Additional detail regarding portion 506 is shown in FIG. 7, where SSK in FIG. 7 is $Ek_{1,1}$ of FIG. 5 and represents the sender's symmetric shared key used to encrypt the message and attachments.

DSB 500 also includes, for each message recipient 1-$n$, the key $Ek_{1,1}$ encrypted by each of the recipient's respective particular public keys (as shown in region 508). Further, DSB 500 includes a combination of each recipient's respective deviceID, hashed username, appID, and the reference value associated with the particular public key (collectively denoted $HWk_{1-n}$) in region 510. These constituent parts are also referred to herein as "parameters." Additional detail regarding the parameters is shown in FIG. 9—namely, a plurality of parameters (such as hashed username, deviceID, and appID) are encrypted using SK2, which is a symmetric key generated by the client and shared with platform 102.

In some embodiments (e.g., as is shown in FIG. 5), a spreading function is used to spread the encrypted symmetric keys inside the DSB (as shown in region 512), by spreading the bits of the encrypted key in a spreading function generated pattern, with the default function being a sequential block or data. The spreading function also contains the cryptographic hashed representation of the recipient usernames that are used by the server to identify the recipients of the message and to set the message waiting flag for each of them. Finally, the DSB is itself encrypted using key $Ek_{1,2}$ (encrypted portion 514), which is a symmetric key shared between app 116 and platform 102. Additional detail regarding portions 514 and 508 are shown in FIG. 8, where SK1 in FIG. 8 is $Ek_{1,2}$ in FIG. 5 and represents the symmetric encryption key shared by the app and platform 102, and where $User_1Pubkey$ in FIG. 8 is $Ek_{2,1}$ in FIG. 5 and represents the recipient's particular public key (e.g., selected from the pool of public keys generated at 202).

Figure 8:
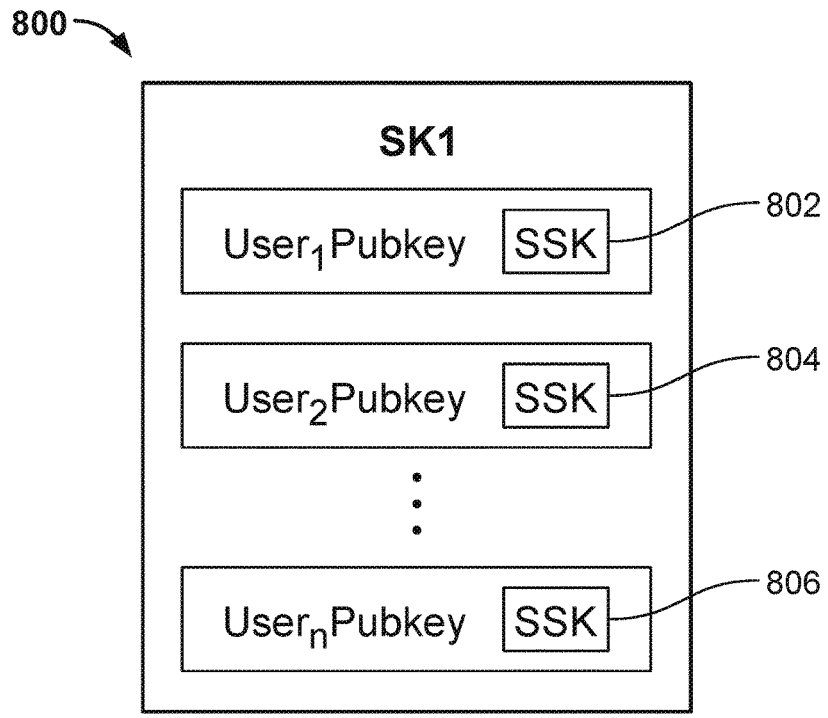
FIG. 8 illustrates an example of a portion of a digital security bubble.
Figure 9:
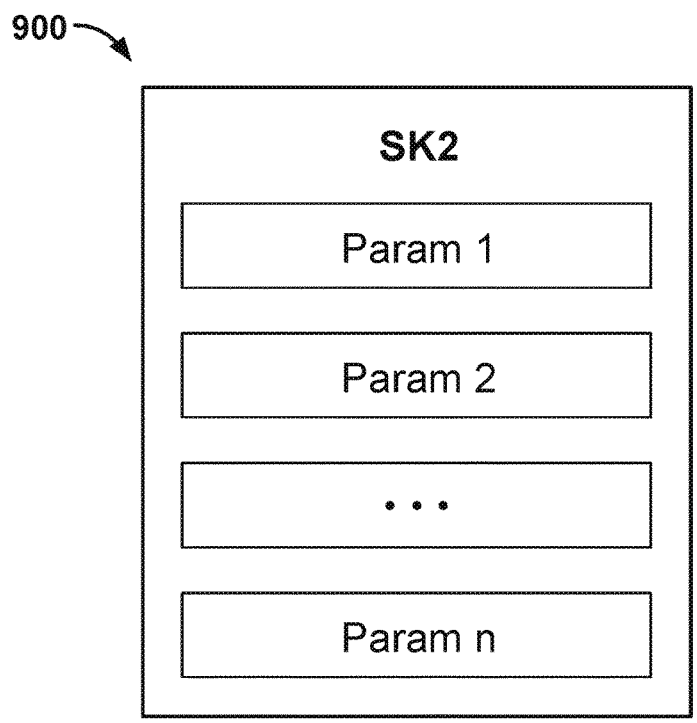
FIG. 9 illustrates an example of a portion of a digital security bubble.

FIGS. 6-9 illustrate additional examples of the construction of an embodiment of a DSB. FIG. 6 illustrates an example of a DSB 600. DSB 600 encapsulates three subcomponents—part 700 (the encrypted message, attachments, and message controls), part 800 (the symmetric key encrypted with each recipient's particular public key selected from the recipients' respective key pools), and part 900 (encrypted message parameters). As with DSB 500, a symmetric key (shared by app 116 and platform 102) is used to secure the DSB. In addition, the transmission of the DSB to the server is encapsulated with TLS for an additional security layer. FIG. 7 illustrates part 700 of DSB 600. In particular, part 700 includes the message controls (702), message (704), and attachments (706). Part 700 is encrypted using a shared symmetric key SSK (e.g., $Ek_{1,1}$). FIG. 8 illustrates part 800 of DSB 600. In particular, part 800 includes the shared symmetric key, encrypted to each of the recipients' respective particular public keys (selected from the recipients' respective key pools). Further, the collection of encrypted keys (802-806) is encrypted using symmetric key SK1. FIG. 9 illustrates part 900 of DSB 600. In particular, part 900 includes encrypted message parameters. Part 900 is encrypted using symmetric key SK2.

E. Receiving DSB Secured Messages

As mentioned above, Bob is also a user of platform 102. When Bob loads his copy of the messaging app on his smartphone (i.e., app 138 on device 114), the app communicates with platform 102 (e.g., via interface 118) to determine whether Bob has any new messages. As will be described in more detail below, platform 102 will also determine how many additional keypairs Bob's device should generate to replenish his pool, and facilitate the generation of those keypairs. Since Alice has sent a message to Bob since he last used app 138, a flag is set in database 120, indicating to app 138 that one or messages are available for download.

Figure 10:
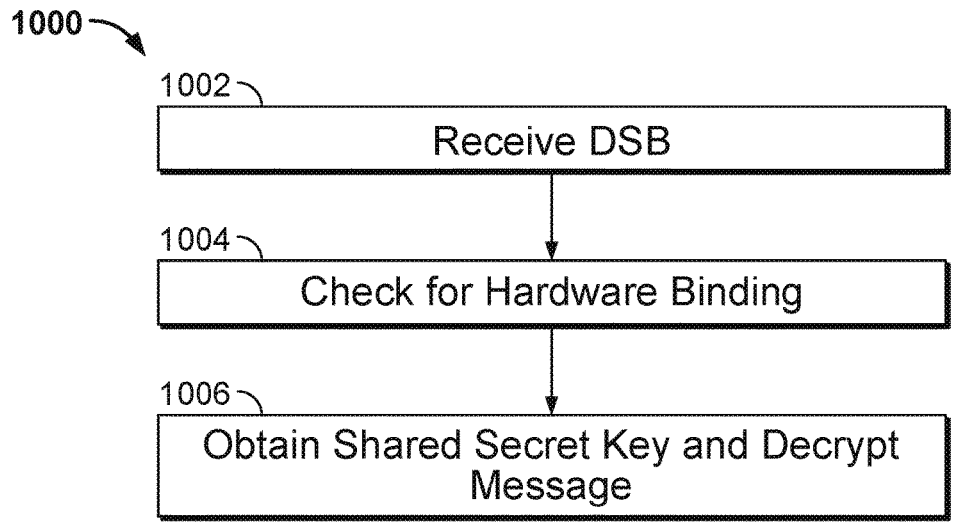
FIG. 10 illustrates an example of a process for accessing a message included inside a digital security bubble.

FIG. 10 illustrates an example of a process for accessing a message included inside a digital security bubble. In some embodiments, process 1000 is performed on a client device, such as Bob's client device 114. The process begins at 1002 when a DSB is received. As one example, a DSB is received at 1002 when app 138 contacts platform 102, determines a flag associated with Bob's account has been set (e.g., indicating he has one or more new messages), and downloads the DSB from platform 102. In such circumstances, upon receipt of the DSB, client 114 is configured to decrypt the DSB using the particular private key of Bob that corresponds to the public key that was selected from his pool at message creation time (and is identifiable by the reference value included in the DSB).

At 1004 (i.e., assuming the decryption was successful), hardware binding parameters are checked. As one example, a determination is made as to whether device information (i.e., collected from device 114) can be used to construct an identical hash to the one included in the received DSB. If the hardware binding parameters fail the check (i.e., an attempt is being made to access Alice's message using Bob's keys on a device that is not Bob's), contents of the DSB will be inaccessible, preventing the decryption of Alice's message. If the hardware binding parameter check is successful, the device is authorized to decrypt the symmetric key (e.g., using Bob's private key generated at 202) which can in turn be used to decrypt Alice's message (1006). As will be described in more detail below (e.g., in Section G), additional controls can be applied (e.g., by Bob's app 138) to Bob's ability to access Alice's message.

F. Additional Example Processes

The following are examples of processes that can be performed by various entities present in environment 100, such as platform 102 and devices 106 and 114 in various embodiments (whether as alternate versions of or additional processes to those described above). The processes can also be performed outside of environment 100, e.g., by other types of platforms and/or devices.

Figure 11:
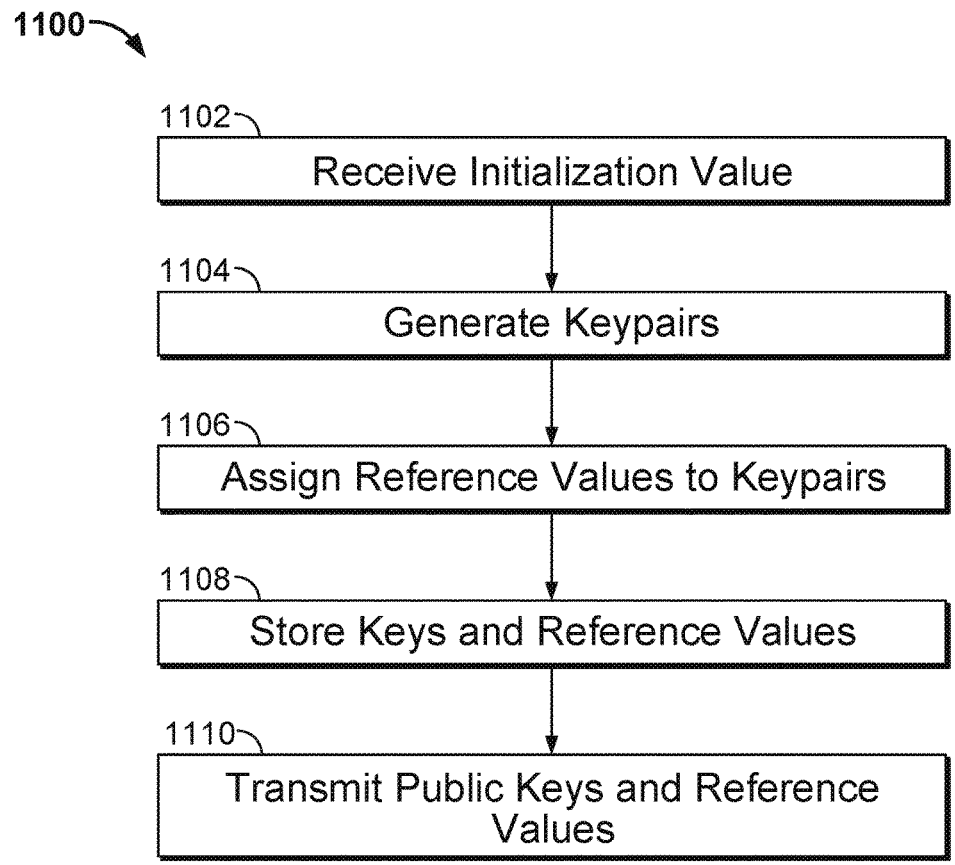
FIG. 11 illustrates an example of a registration process.

FIG. 11 illustrates an example of a registration process. In some embodiments, process 1100 is performed by device 106. Process 1100 can also be performed by other devices, including devices in environments other than those shown in FIG. 1. Process 1100 begins at 1102 when an initialization value is received. As one example, an initialization value of 50 (corresponding to a target minimum server key cache size of fifty public keys to be stored on platform 102) is received at 1102. In some embodiments, in response to receiving a request from a device, such as device 106, platform 102 sets a server count (C)=0. The server count represents the number of public keys currently stored on platform 102 associated with the device. As device 106 is registering, no keys are present yet on platform 102.

At 1104, a number of keypairs is generated. In this example, a number of asymmetric keypairs equal to the initialization value received at 1102 (e.g., fifty) is generated. In some embodiments, the keypairs are randomly seeded.

At 1106, reference values (e.g., usable to uniquely identify each of the key pairs and described in more detail above) are assigned for each of the keypairs generated at 1104.

At 1108, the private key portion of the key pairs (i.e., the fifty private keys) and associated reference values are securely stored locally (e.g., on device 106). As one example, the private keys are inserted into a database resident on device 106 and secured using an AES key derived from the password selected by Alice at portion 210 in process 200.

Finally, at 1110, the public key portion of the key pairs (i.e., the fifty public keys) and associated reference values are securely transmitted to platform 102. As mentioned above, platform 102 will designate one of the fifty keys as a reserve key (e.g., by setting a flag associated with that particular key).

Figure 12:
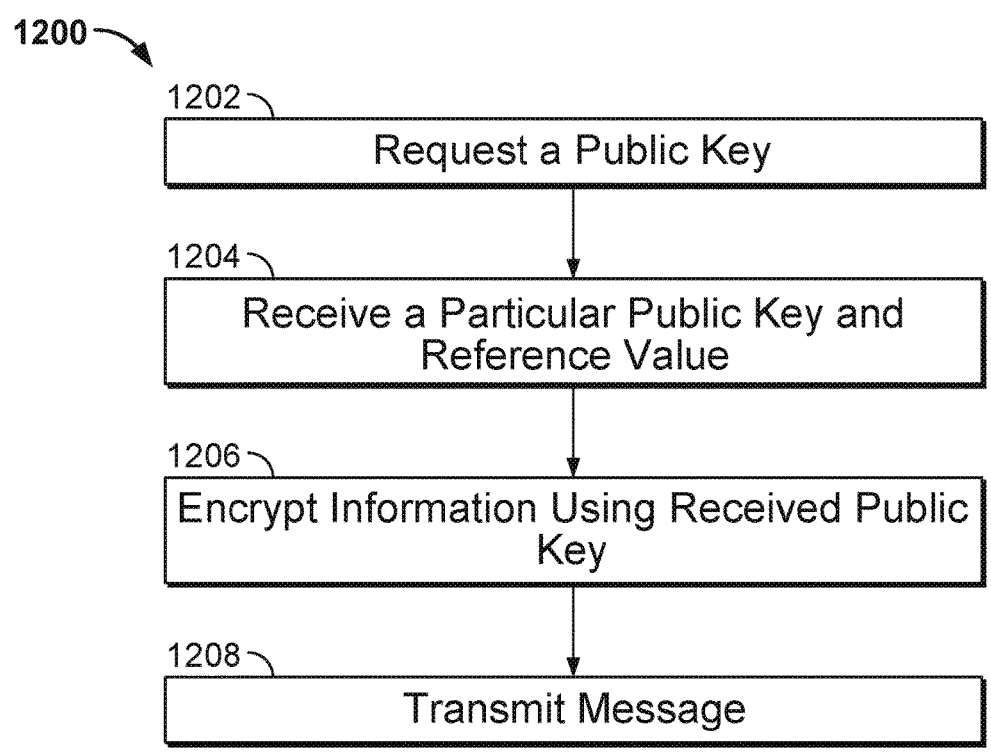
FIG. 12 illustrates an example of a process for sending a message.

FIG. 12 illustrates an example of a process for sending a message. In some embodiments, process 1200 is performed by device 114 (e.g., when Bob wants to send a message to Alice). Process 1200 begins at 1202 when device 114 requests a public key associated with Alice from platform 102 (and after any applicable privacy checks have been performed). If multiple public keys for Alice are present in her pool of keys (i.e., the pool of public keys stored on platform 102 for Alice), the platform will preferentially select (whether randomly, sequentially, or by any other appropriate selection technique) one of the non-reserve keys, and delete the selected key in an atomic operation in conjunction with sending the selected key to device 114. As will be described in more detail below, if only one public key is present for Alice (i.e., only the reserve key remains in the pool), platform 102 will send the reserve key to device 114, but will not delete the reserve key from platform 102 (until such time as the reserve key is replaced with a new key designated as the reserve).

At 1204, a public key is received (e.g., by device 114 from platform 102) along with the reference value associated with the key.

At 1206, the received public key is used to encrypt information, such as a message, or other information (e.g., a symmetric key which in turn is used to encrypt the message). The key reference value associated with the received public key is included in the message metadata or otherwise incorporated into the message payload.

Finally, at 1208, device 114 sends the message (e.g., to platform 102 for retrieval by Alice). Note that using techniques described, Alice's device(s) need not be online (e.g., connected to platform 102) at the time Bob composes and/or sends messages to her.

Figure 13:
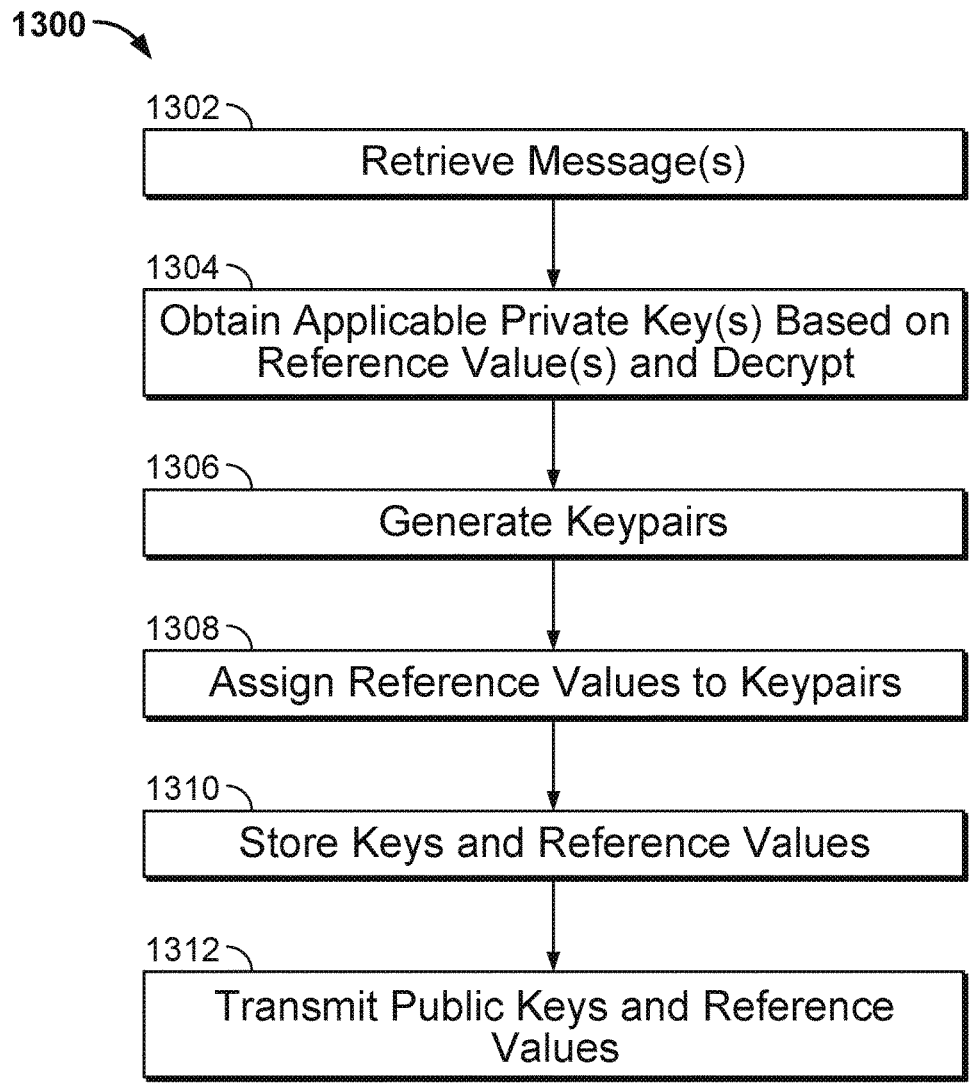
FIG. 13 illustrates an example of a process for performing a synchronous key cache update.

FIG. 13 illustrates an example of a process for performing a synchronous key cache update. In some embodiments, process 1300 is performed by device 106 (e.g., when Alice connects to platform 102 to retrieve messages). The process begins at 1302 when device 106 connects to platform 102 and retrieves one or more messages.

For each retrieved message (at 1304), read the respective key reference value (e.g., included in the respective message as metadata), retrieve the appropriate private key (i.e., having the key reference value) from local storage on device 106, and decrypt the message(s).

At 1306, device 106 generates additional keypairs (i.e., to replenish public keys used from the pool on platform 102 by Bob). The number of keys to be generated can be determined in a variety of ways. As one example, device 106 can generate a number of new keypairs equal to the number of messages she received at 1302. As another example, device 106 can be instructed (whether by platform 102 or local instructions) to generate the lesser of: A: (the number of messages downloaded at 1302$*V$), where (V) is a variable impacting the desired expansion rate of the server cache size (e.g. 0.9); or B: the initialization value (e.g., 50 keys, as discussed at 1102 in process 1100).

At 1308 (similar to 1106), reference values (e.g., usable to uniquely identify each of the key pairs and described in more detail above) are assigned for each of the keypairs generated at 1308.

At 1310 (similar to 1108), the private key portion of the key pairs (i.e., the new private keys) and associated reference values are securely stored locally (e.g., on device 106). As one example, the private keys are inserted into a database resident on device 106 and secured using the password selected by Alice at 210 in process 200.

Finally, at 1312 (similar to 1110), the public key portion of the key pairs (i.e., the new public keys) and associated reference values are securely transmitted to platform 102. In this example, suppose Alice's reserve key was not depleted. The key originally designated as her reserve key remains present on platform 102 and remains designated as the reserve key. Now suppose Alice's reserve key was depleted (e.g., because Bob and/or other users of platform 102 sent Alice more than fifty messages prior to her connecting to platform 102). The first 49 messages addressed to Alice would make use of those public keys in her pool not designated as the reserve key. Any additional messages sent to Alice before she can replenish her pool will all make use of her reserve public key (i.e., messages 50, 51, and 52—whether from Bob or others, will all make use of the same public key for Alice—her reserve key). As will be explained below, when Alice's pool has been deleted (i.e., her reserve key is being used), a flag will be set on platform 102 indicating that, in conjunction with her next execution of process 1300 (or portions thereof, as applicable), a new key should be designated as the reserve key, and the existing reserve key be destroyed. Additional actions can also be taken (e.g., by platform 102) in response to Alice depleting her key pool, such as by increasing the size of her pool.

Figure 14:
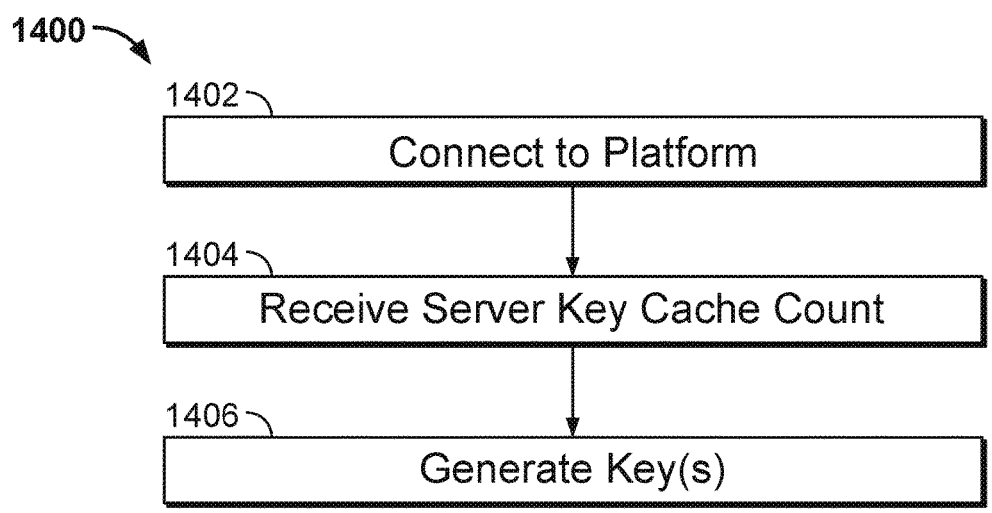
FIG. 14 illustrates an example of a process for performing an asynchronous key cache update.

FIG. 14 illustrates an example of a process for performing an asynchronous key cache update. In some embodiments process 1400 is performed by device 106. Process 1400 begins when device 106 connects to platform 102. The connection can be periodic (e.g., app 116 can be configured to connect to platform 102 once a day, once an hour, etc.) and can also be in response to triggering events (e.g., Alice's phone was powered off and has just been powered on, has just connected to a cellular or other network, etc.).

At 1404, the device receives the current server key cache count (i.e., the number of keys presently in the platform's pool for the user). At 1406, the device generates an appropriate number of keypairs (and reference values) and stores/transmits them in accordance with the techniques described above. Further, in the event the server key cache count is zero (i.e., the reserve key is being used by platform 102 due to key pool depletion), one of the newly generated keys will be designated by the server as a replacement reserve key and the old reserve key will be destroyed.

G. Secure Time-to-Live (TTL)

As mentioned above, one example of a message control a sender can specify for a message is a limit on the time period (also referred to herein as a "time-to-live" or "TTL") during which a recipient is able to access the message (e.g., to view, listen to, or otherwise interact with the message and any attachments). In scenarios such as where the sender is using an embodiment of platform 102 operated by an enterprise on behalf of its employees, the TTL may be selected by an entity other than the sender (e.g., based on a default corporate policy, or based on administrator configurable rules implemented by an enterprise-specific version of the secure messaging application). For example, messages sent by employees to one another (e.g., as specified on a privacy list)

can have a first default TTL, and messages sent by employees to vendors (also using the enterprise-specific application) can have a second default TTL. As another example, messages sent by certain employees (e.g., within a particular department such as the legal department, or having certain titles or positions, and, e.g., as specified on a privacy list) can be given different default TTLs. In various embodiments, the default TTL can be overridden, if permitted by an administrator configuration.

The TTL is encrypted and sent together with the secure message. When the recipient opens the message (e.g., taps or clicks on the message in an app), the message is decrypted and displayed on the recipient's device. The corresponding TTL is decrypted, and in some embodiments converted into a message expiry time by adding the TTL (e.g., expressed in seconds) to the current time. In various embodiments, the TTL is stored in the recipient's device's secure database and encrypted to prevent tampering with the secure TTL by the device's user. As will be described in more detail below, the current time can also be secured (e.g., against attempts by the recipient to thwart the TTL by adjusting a clock on the recipient's device). Once the TTL has expired, the message is no longer accessible to the recipient (e.g., is removed from the recipient's viewing interface and deleted from the recipient's device's secure database, along with any associated decryption keys).

The sender (or sender's application, as applicable, e.g., where configured by an enterprise administrator) can specify time limits in a variety of ways. As one example, the sender can set a maximum duration (e.g., a one day limit), with the time limit countdown commencing when the recipient first opens the message. The time limit countdown can also be commenced when the sender sends the message. As another example, the sender can specify a fixed start time (e.g., for embargo purposes) before which the recipient is unable to access the message, even if the recipient is already in possession of the message. Once the embargo period ends, as with above, a TTL value can control how long the recipient is able to view the message once opened. This allows, for example, a company to release company news to multiple shareholders in a secure, time-controlled manner, with each shareholder having the same opportunity to open the message at the same start time. This also allows an enterprise to implement rules (e.g., via an enterprise-specific version of the secure messaging application/platform 102) that only allow employees to open messages during certain periods of the day. (E.g., hourly workers can only read messages during business hours; salaried workers have no such prohibition.) As yet another example, the sender can specify a fixed end time after which the recipient is unable to access the message (irrespective of whether the message was also given an "upon opening" TTL, e.g., of ten minutes). Further, in various embodiments, a sender of the message can shorten a limit on an already sent message. For example, if Bob sends Alice a message with a one day limit, and Alice opens that message, Bob can subsequently revoke Alice's ability to continue to read the message (even though the day has not passed) by interacting with his app (e.g., by long pressing on the sent message as it appears to Bob and selecting an "expire now" (immediately expiring the message) or "expire faster" (expiring the message at a new time picked by Bob) option, as applicable).

Figure 15:
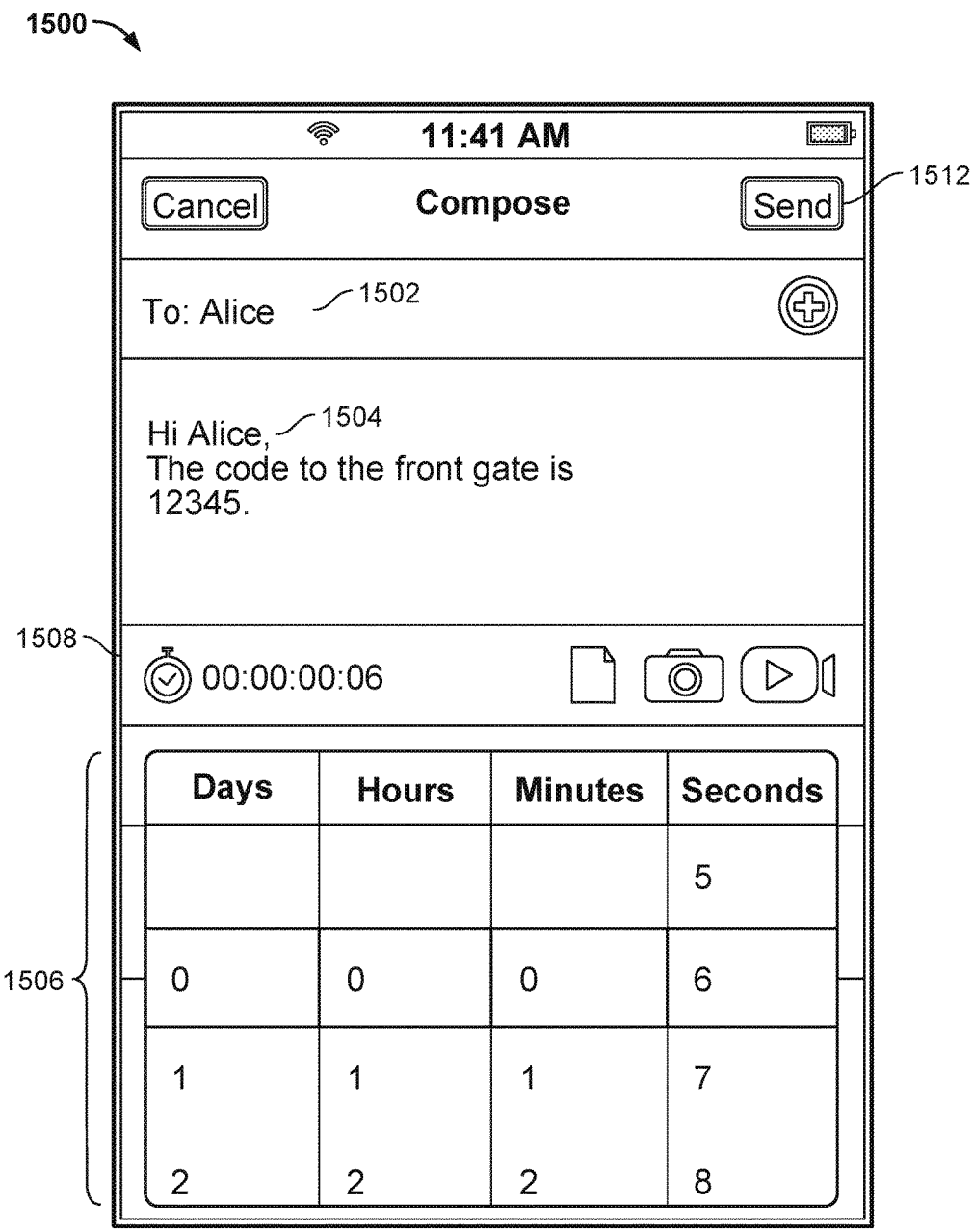
FIG. 15 illustrates an embodiment of a message composition interface.

FIG. 15 illustrates an embodiment of a message composition interface. In particular, FIG. 15 depicts interface 1500 as rendered on Bob's phone 112. In the following example, Bob is composing a message to Alice. In region 1502, Bob has indicated that he would like to send a message to Alice. In region 1504, Bob has provided a message for Alice. Specifically, Bob has provided Alice with information about how to enter a locked gate. By interacting with region 1506, Bob can select an amount of time for which, once Alice opens Bob's message, Alice will be able to view the message. As shown in region 1508, Bob has decided to allow Alice to read the message for six seconds once she opens it. When Bob sends the message (by selecting button 1512), a time value of six seconds (an example of a TTL) will be included as a message control (e.g., an example of message control 504).

Figure 16:
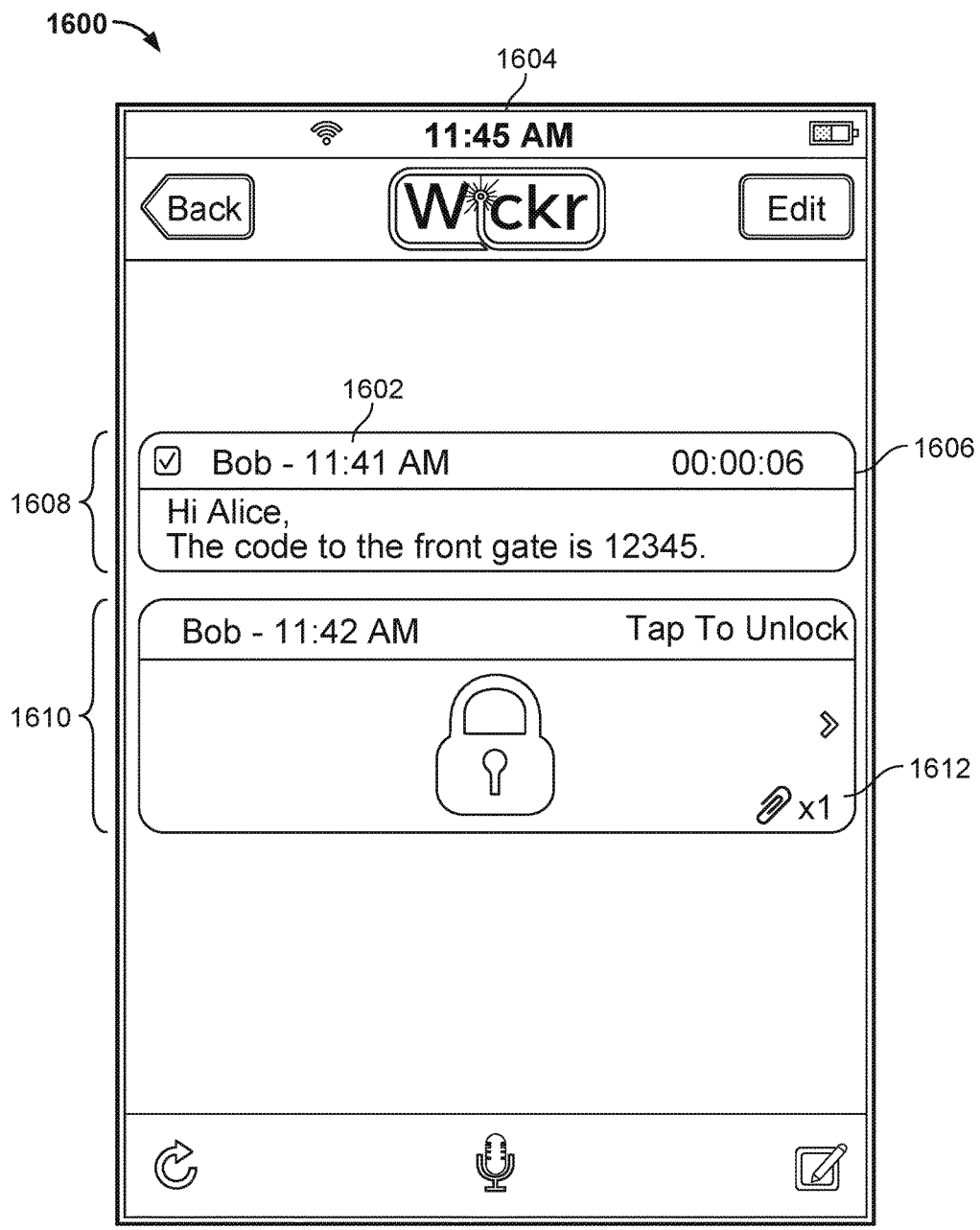
FIG. 16 illustrates an embodiment of a message viewing interface.

FIG. 16 illustrates an embodiment of a message viewing interface. In particular, FIG. 16 depicts interface 1600 as rendered on Alice's tablet 106. In the example of FIG. 16, Alice has just opened the message Bob was composing in interface 1500 of FIG. 15. As indicated in region 1602, Bob sent the message to Alice at 11:41 am. As indicated in region 1604, Alice's device has a time of 11:45 am. As indicated in region 1606, Alice has six seconds to read message 1608. After the six seconds have elapsed, message 1608 will be removed from interface 1600 (and deleted from Alice's device). Also shown in interface 1600 is a message from Bob that Alice has not yet opened (1610). Bob sent message 1610 at 11:42 am, and message 1610 includes one attachment, as indicated in region 1612. Since Alice has not yet opened message 1610, the TTL for message 1610 has not yet been applied to the message. Alice can open message 1610 by clicking on it with her finger. In the event Alice has multiple devices, in some embodiments a received but unopened message (e.g., message 1610) will appear on all of Alice's devices rendered in the manner shown in FIG. 16. In some embodiments, once Alice opens the message on one of the devices, she will be unable to open the message on any of her other devices (i.e., any additional copies of message 1610 will be removed, unopened, from Alice's other devices). In other embodiments, Alice's messages are synchronized across all of her devices, and Alice is allowed to read any of her messages which have not yet expired on any of those devices. In this scenario, the remaining TTL for a given message can be calculated using the time the message is initially opened on a first device/file, and the remaining TTLs reported by all devices on which the message has been opened. For example, suppose Bob sends a message to Alice and sets the TTL to ten minutes. If Alice has three different devices associated with her account (e.g., an iPhone, an Android tablet, and a desktop computer), she is allowed to open the message on any (or all) of her devices as long as the TTL that Bob established (ten minutes in this example) is not exceeded, collectively, across Alice's devices. Suppose Alice opens the message first on her iPhone (e.g., at 11 am) and views it for three minutes. The TTL for the message at that moment is 10−3=7 minutes. If, after two more minutes (e.g., at 11:05 am) Alice opens the same message on her desktop computer, the TTL is now 7−2=5 min. After five more minutes have elapsed (e.g., it is now 11:10 am), if she tries to open the message again on her iPhone, or on her Android tablet, the TTL will be zero, and the message will be deleted from all of Alice's devices. One way of synchronizing the TTL in a multi-device scenario (also referred to herein as the "global TTL" for the message) is for each app to report the remaining TTL for a particular message ID each time the message is opened on that device. The global TTL for that message ID can be synchronized between all of Alice's devices via a variety of mechanisms. For example, Alice's devices could be configured to update one another on the remaining TTL. As another example, platform 102 can receive updates (i.e., reported openings/TTLs) from each of Alice's devices and share that information with other of Alice's devices with the remaining TTL.

Figure 17:
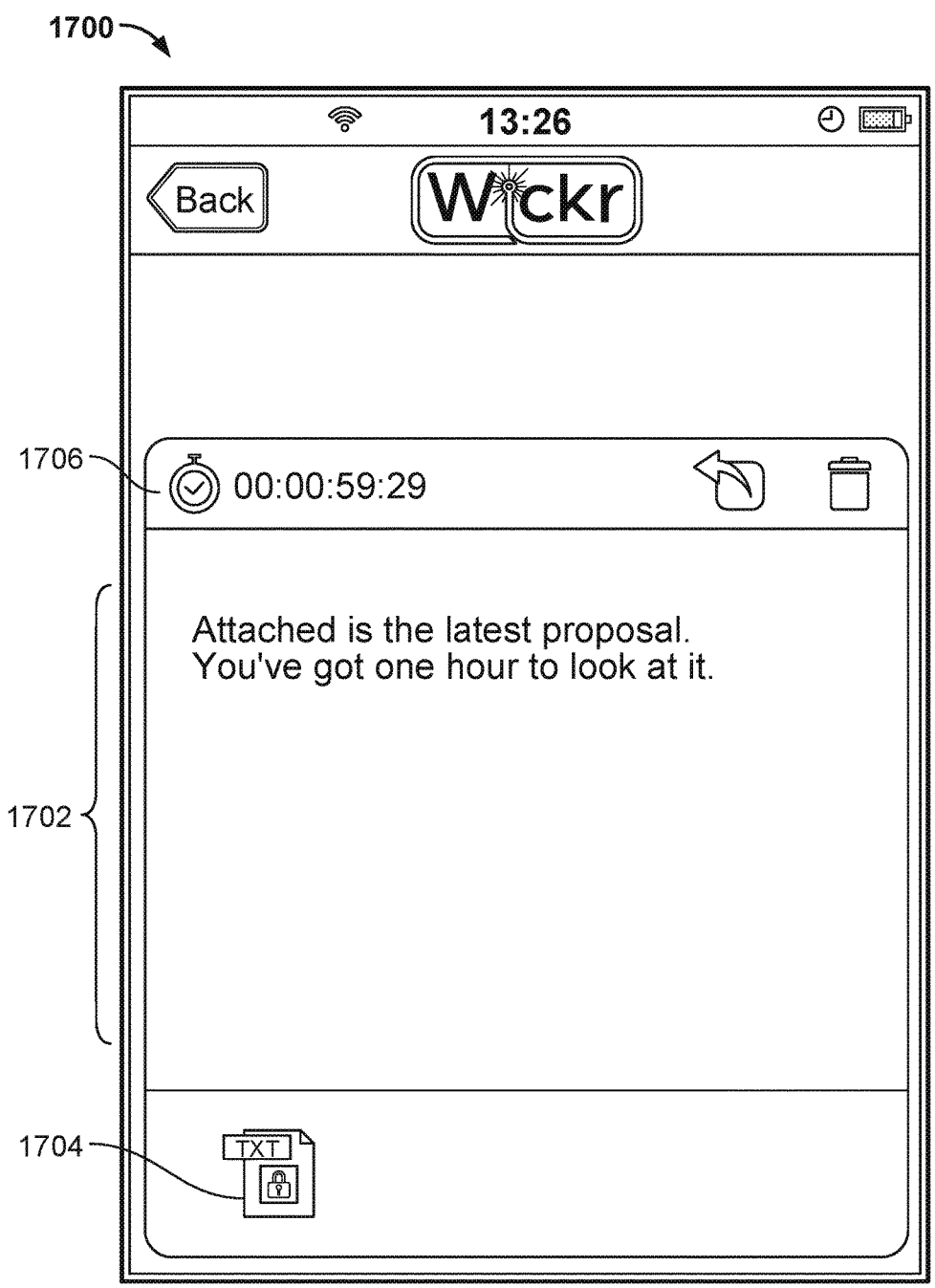
FIG. 17 illustrates an embodiment of a message viewing interface.

FIG. 17 illustrates an embodiment of a message viewing interface. In particular, FIG. 17 depicts interface 1700 as rendered on Alice's tablet 106. In the example of FIG. 17, Alice (at 1:26 pm) has just opened the message that Bob sent her at 11:42 am (i.e., Alice has just opened message 1610 of FIG. 16). Message 1608 is no longer available to Alice as its TTL has expired. In region 1702, Alice is viewing text authored by Bob. Alice can review an attachment that Bob sent by clicking on region 1704. Region 1706 includes a countdown timer that indicates to Alice that she has approximately one hour (59 minutes and 29 seconds) remaining to read Bob's message and view the attachment. When the timer reaches zero, Alice will be unable to view the message or attachment further.

Figure 18:
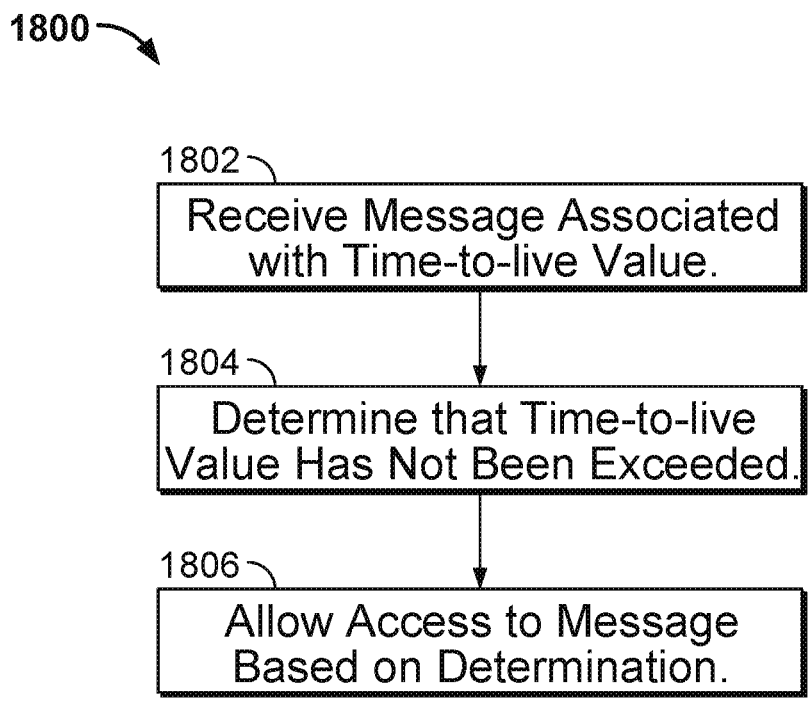
FIG. 18 illustrates an example of a process for determining whether to allow access to a message.

FIG. 18 illustrates an example of a process for determining whether to allow access to a message. In various embodiments, process 1800 is performed on a client device, such as Alice's client device 106. The process begins at 1802 when a message is received. The message has an associated TTL value (or, as explained in more detail below, in some embodiments has a set of associated time-related values). As one example, Bob's message 1610 is received by Alice's device 106 at 1802. Message 1610 has an associated TTL of one hour (3600 seconds), as selected by Bob during message composition. In some embodiments, the TTL is stored in Alice's device's secure database (i.e., preventing tampering with the value by Alice). Next, a determination is made as to whether the TTL has been exceeded. If the TTL has not been exceeded (1804), the message is made available to the recipient (1806). As one example, when Alice initially opens message 1610, the associated TTL (3600 seconds) is decrypted and read by app 116. App 116 begins counting down (using the TTL). So long as the TTL has not been exceeded (e.g., 3601 seconds have elapsed since Alice opened the message), Alice can continue to view the message via app 116. Once the TTL has been exceeded, the message will be removed from her device (e.g., no longer shown on her device's screen and deleted from her device's secure database).

Figure 19:
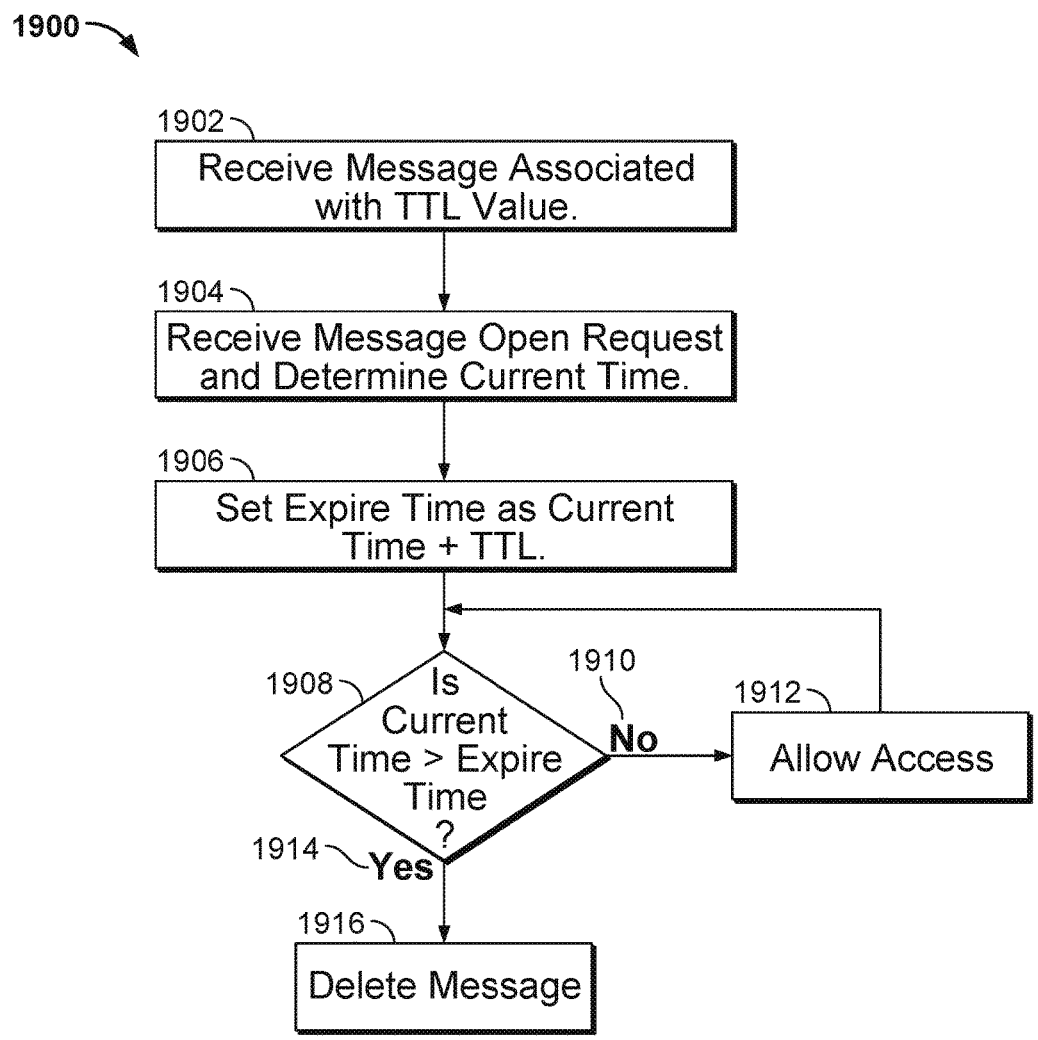
FIG. 19 illustrates an example of a process for determining whether to allow access to a message.

FIG. 19 illustrates an example of a process for determining whether to allow access to a message. Process 1900 is an embodiment of process 1800 and is in some embodiments performed on a client device such as Alice's client device 106. The process begins at 1902 when (as with 1802) a message that has an associated TTL value is received. At 1904, a message open request (e.g., Alice clicking on the lock icon shown in FIG. 16) is received and in response a Current Time is determined. One approach for determining a Current Time is to use the device time. However, a nefarious device user could attempt to circumvent TTL enforcement by modifying the device date, time, and/or time zone settings. A second approach for determining a Current Time is for the recipient's secure messaging app (e.g., app 116 in the case of Alice) to contact platform 102 (or another external time source, such as a dedicated time server) and obtain a Current Time from platform 102 (or the other external time source). In some embodiments, if app 116 is unable to obtain a Current Time (e.g., device 106 is in airplane mode or otherwise offline; or if platform 102 or the other external time source(s) are unreachable), Alice will be unable to open the message (until such time as app 116 is able to obtain a Current Time).

At 1906, the message expiration time ("Expire Time") is set as the Current Time (determined at 1904) with the TTL (e.g., 3600 seconds) added. Thus for example, when Alice opens message 1610 (e.g., at 1:26 pm), a Current Time is obtained from platform 102 (or another appropriate external time source), and a TTL of 3600 is added to the Current Time, resulting in an Expire Time of 2:26 pm.

At 1908, a determination is made as to whether the Current Time is greater than the Expire Time. If not (1910), Alice is able to view the message (1912), and after a period of time (e.g., one second elapsing), another check of the Current Time vs. the Expire Time is performed (1908). In various embodiments, the Current Time continues to be obtained from an external source (e.g., device 106 contacts platform 102 every second). In other embodiments, app 116 is responsible for maintaining the Current Time, at least a portion of the time, after performing an initial check with platform 102 of the Current Time upon message open. In some embodiments, if a Current Time cannot be obtained from an external source (e.g., platform 102 or another server) during the ongoing checking of portion 1908, the message will cease being available to Alice. So, for example, if Alice temporarily loses connectivity during the one hour window of time Bob has allowed her to read message 1610, Alice will be unable to read message 1610 during that portion of the hour. In some embodiments, the TTL countdown continues, irrespective of whether Alice is offline, meaning that Alice will not be given additional time to view the message to compensate for the period her device lacked connectivity. Eventually (e.g., after one hour has elapsed), the Current Time will exceed the Expire Time (1914), at which point the message is deleted (1916).

Figure 20:
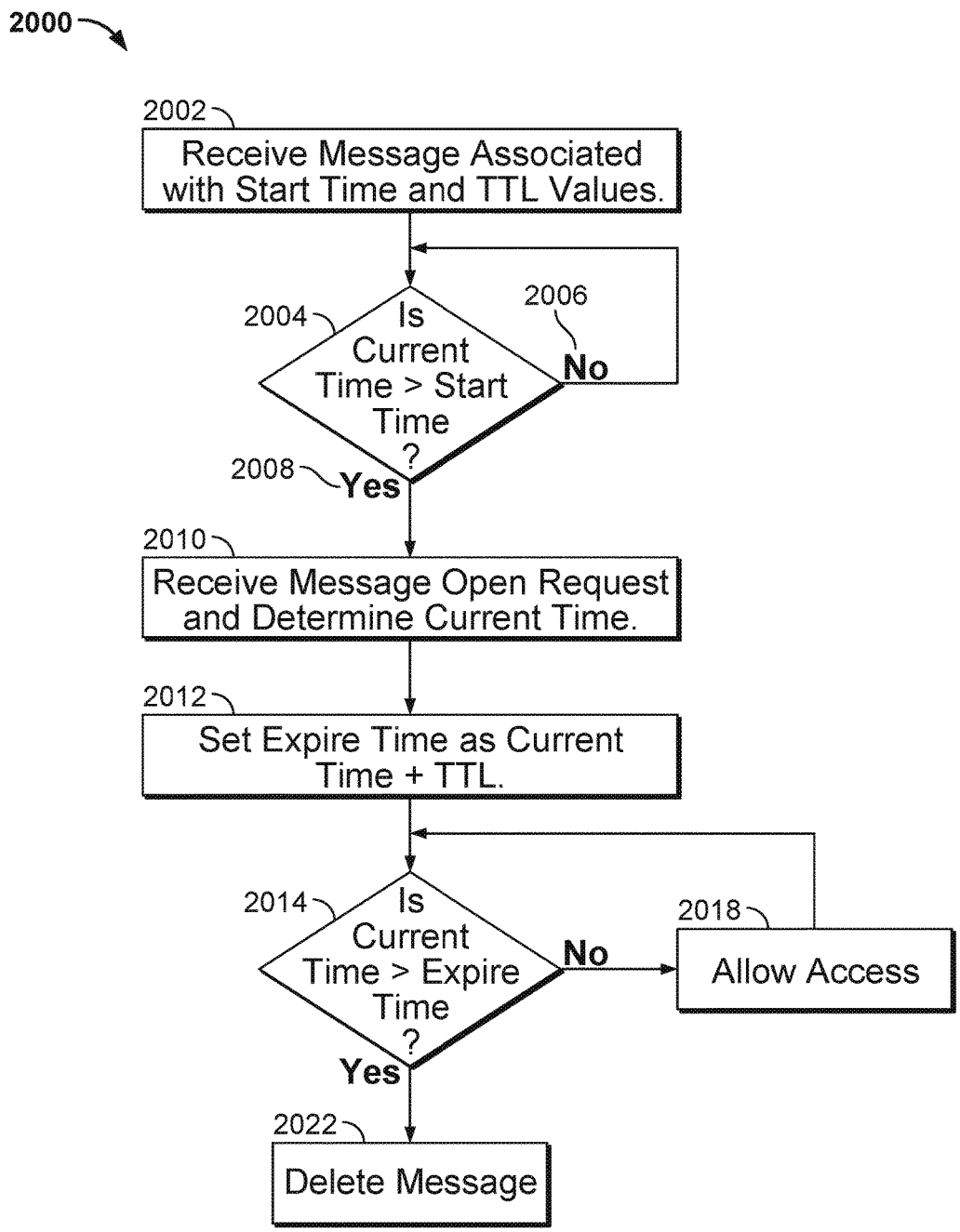
FIG. 20 illustrates an example of a process for determining whether to allow access to a message.

FIG. 20 illustrates an example of a process for determining whether to allow access to a message. Process 2000 is an embodiment of process 1800 and is in some embodiments performed on a client device such as Alice's client device 106. The process begins at 2002 when a message that has multiple TTL-related values is received. As one example, a start time (i.e., embargo time) is provided, as is a duration (e.g., 3600 seconds, as per above). Process 2000 can also be adapted to accommodate a hard end time (instead of, or in addition to a start time), as applicable. At 2004, a determination is made (e.g., by contacting platform 102) whether the Current Time exceeds the Start Time. If not (2006), any requests by Alice to open the message will be ignored, as the end of the embargo has not yet been reached. And, additional checks of the Current Time vs. the Start Time will continue until the embargo ends (2008). The remainder of process 2000 continues as per process 1900. E.g., a message open request is received, and a Current Time determined (1904, 2010); the Expire Time is set as the Current Time and TTL (1906, 2012); and the Current Time is checked against the Expire Time (1908, 2014) to determine whether to continue to allow access to the message (1912, 2018) or delete the message (1916, 2022).

H. Mutual Privacy Management

Traditional messaging systems typically allow all users of the system to generate and send a message to an arbitrary recipient. If the recipient does not want to receive messages, the recipient must either rely on spam filters or delete the messages after they arrive, as applicable. The sender in a traditional system is not prevented from sending messages to a recipient that does not wish to receive messages, thus wasting money, creating congestion on the network(s), wasting bandwidth, wasting processing power, and annoying the recipient, etc.

In contrast, using techniques described herein, users of embodiments of platform 102 (or their representatives, as applicable) are able to edit "privacy" lists, which allow would-be recipients to control from whom they receive messages. In various embodiments, the user's privacy list is stored in database 120 (e.g., in encrypted form, with username entries stored as hashes), and is globally applied across all of the user's devices (where the user has multiple devices configured to use platform 102). As will be described in more detail below, in some embodiments the privacy settings are "mutual," meaning that if a first user chooses not to receive messages from a second user, the first user will symmetrically be unable to send messages to the second user. In various embodiments, users are able to select from (and switch between) one of two privacy modes: a "block mode" and a "whitelist mode." Based on which mode the user is in, the user's privacy list will have different effects. In some embodiments, instead of having a single list (treated differently based on which mode the user is in), the user has a respective list for a respective mode. As one example, where platform 102 is operated on behalf of an entity such as a school, certain user accounts (e.g., "announcements" or "campus policy") can be included in a universal whitelist, applicable to all users irrespective of individual user settings. In such a scenario, students (or other users of the school-specific platform) are otherwise able to operate in allow or block mode, and make individual choices about which usernames to include in their individual privacy list. In various embodiments, the user can only be in one privacy mode at a time (e.g., preventing the user from inadvertently misconfiguring the user's settings to prevent all users of the system from messaging the user).

Figure 21:
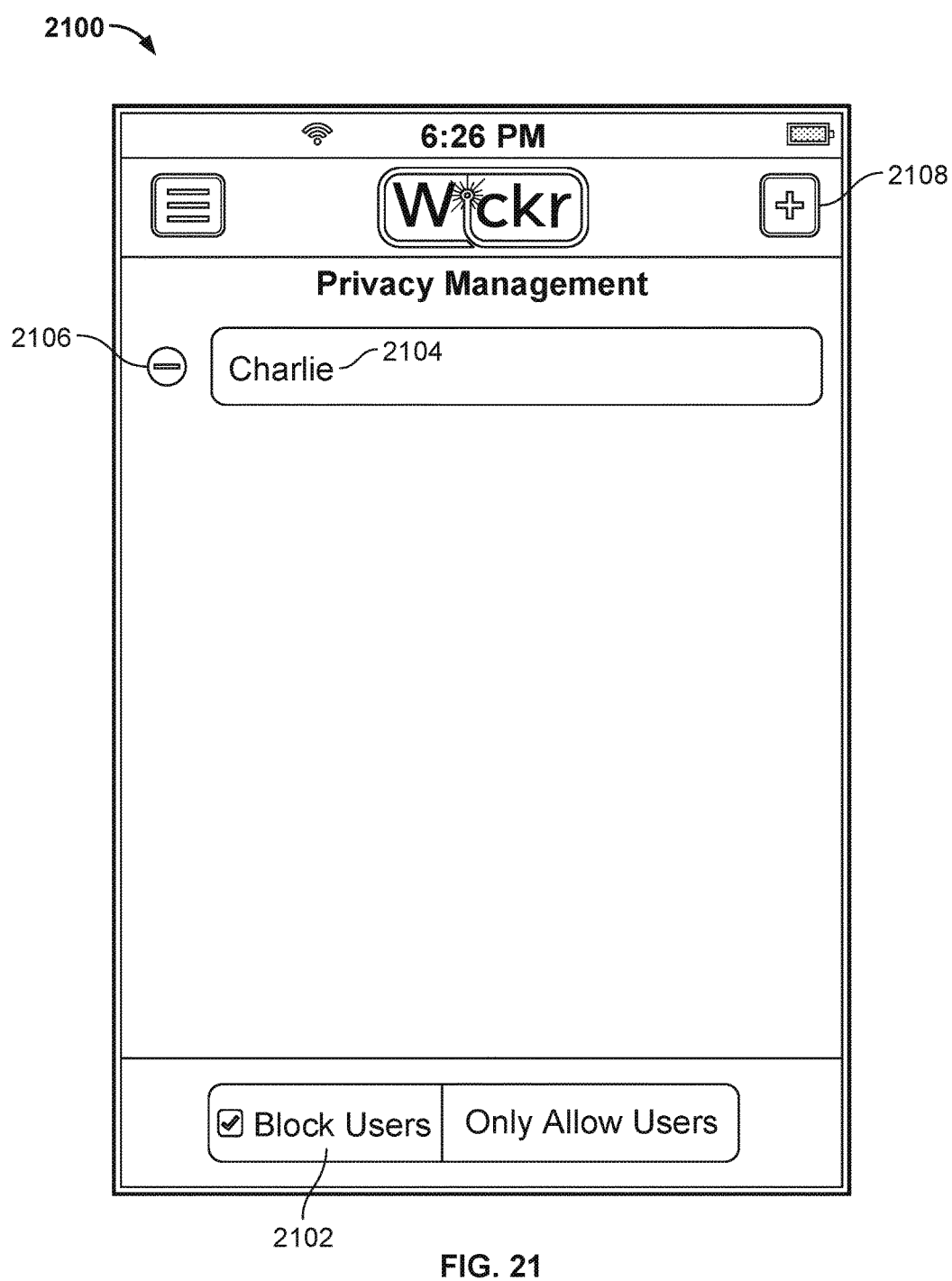
FIG. 21 illustrates an example of an interface in which a user can specify a privacy setting.

Suppose Alice has been receiving unwanted messages from a user of platform 102, "Charlie." Alice would like to prevent Charlie from sending any more messages to her. Alice can use the "block mode" to provide a list of specific users (such as Charlie) who should be blocked from sending her messages. Charlie (once blocked by Alice) will be unable to send messages to Alice because platform 102 will not provide Charlie with Alice's public key. In FIG. 21, Alice has selected to be in "block mode" by clicking on region 2102 (as indicated by the checkmark). Charlie is the first user Alice has decided to block, and she enters his username in region 2104. Alice can later un-block Charlie, if desired, by clicking on region 2106. Alice can add additional users to be blocked by clicking region 2108 and providing their usernames, if desired. When a user (e.g., Alice) is in block mode, the user will be able to receive messages from any users not appearing on the list (also referred to herein as a "privacy list") such as the list (of just Charlie) shown in FIG. 21. The privacy setting is mutual, meaning that Alice will also be unable to message Charlie if she adds him to her privacy list while in block mode (i.e., Alice will symmetrically be unable to obtain Charlie's public key from platform 102 while she has blocked Charlie).

Figure 22:
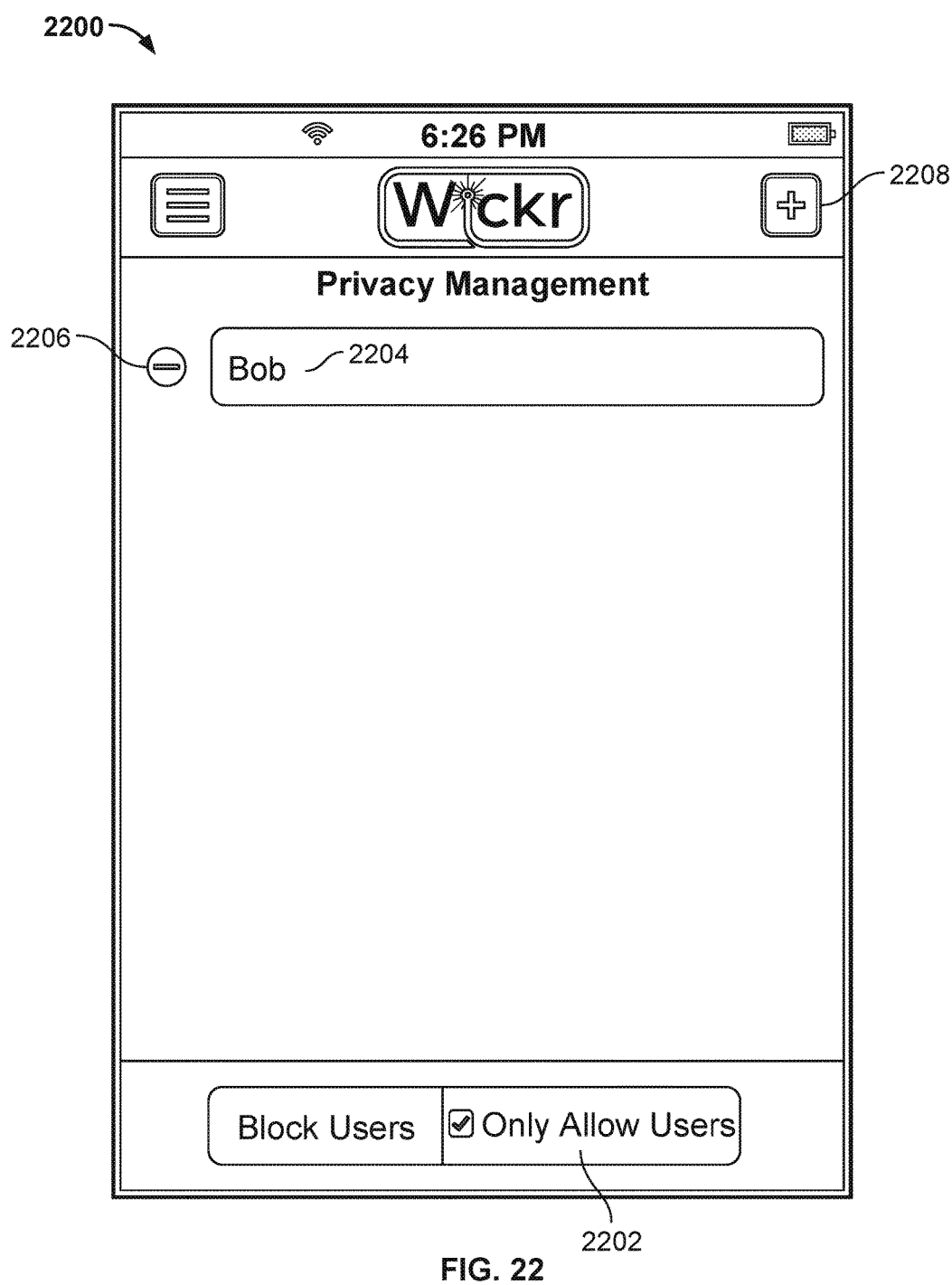
FIG. 22 illustrates an example of an interface in which a user can specify a privacy setting.

An alternate way for Alice to prevent Charlie from sending her messages is for Alice to enter "whitelist mode." In whitelist mode (also referred to herein as "allow mode"), only those users whose usernames Alice has added to her privacy list will be able to obtain her public key and thus send her messages. And, in some embodiments, symmetrically, Alice will only be able to send messages to (i.e., obtain the public keys of) those users appearing in her privacy list while in whitelist mode. In FIG. 22, Alice has selected to be in "whitelist mode" by clicking on region 2202 (as indicated by the checkmark). Alice likes communicating with Bob and so has entered his name in region 2204 (indicating that Bob is allowed to send her messages (i.e., obtain her public key)). Alice can remove Bob from her privacy list by clicking on region 2206 and can add additional users to her privacy list by clicking on region 2208.

In various embodiments, an entity other than the end user of platform 102 (or embodiments of platform 102) has control over that end user's privacy list (or, as applicable, can configure a supplemental privacy list for the user). As one example, suppose an embodiment of platform 102 is made available to families as a service. Parents of children using the service are able to customize (e.g., through a password-protected interface on their child's app) whether their child's app should operate in block mode or whitelist mode. Those parents can further configure which usernames should appear on their child's privacy list (e.g., resulting in a messaging app that allows the child to communicate with family members and known friends only). As another example, where platform 102 is operated on behalf of a University, the University-specific embodiment of the secure messaging app can be configured to support a pre-defined whitelist (e.g., such that all University-specific secure messaging apps will always allow communications from certain University accounts, such as campus police to be sent) and permit students to optionally configure their own individual block lists (e.g., of other students they do not want to receive messages from), if desired.

Figure 23:
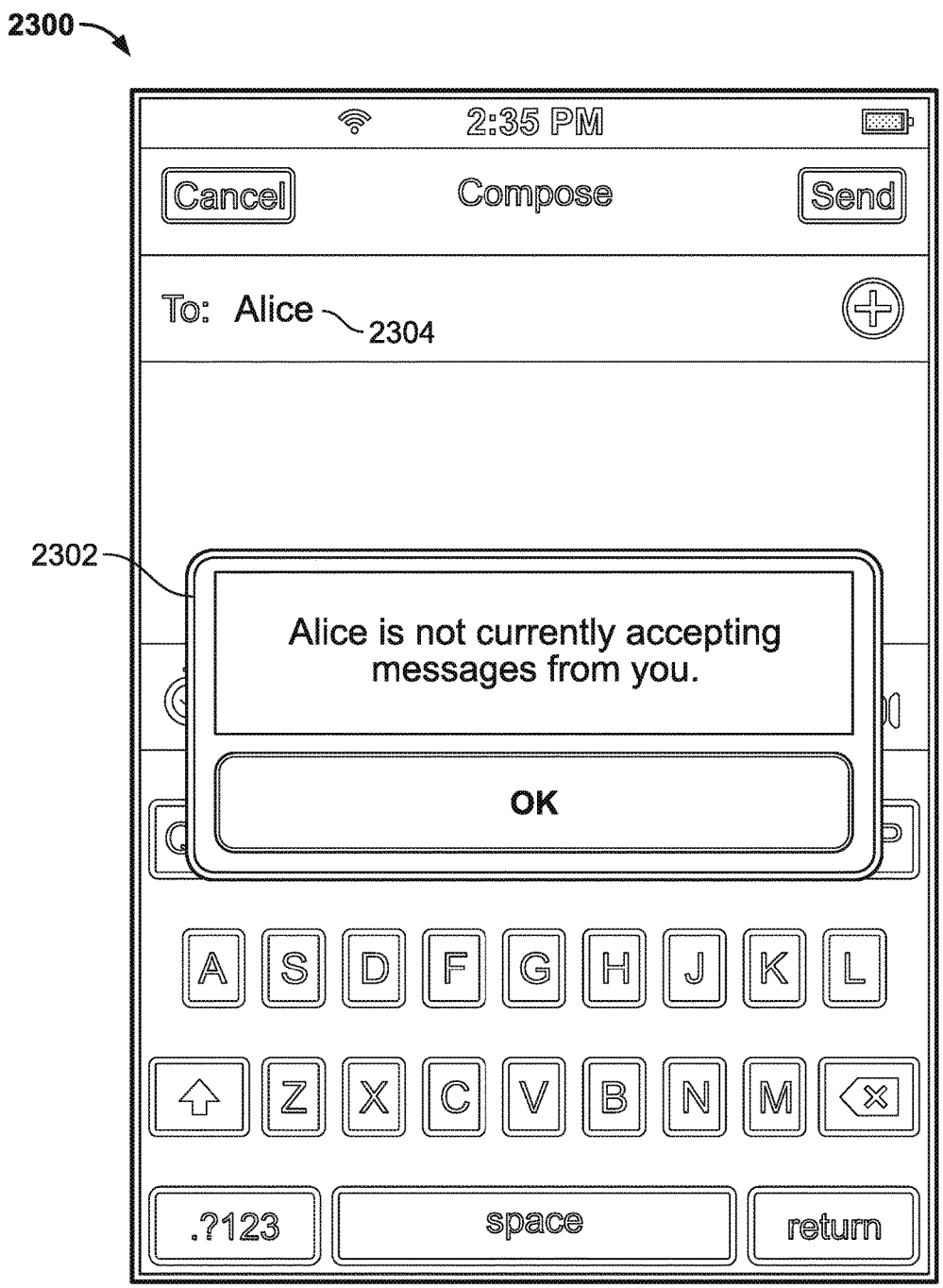
FIG. 23 illustrates an embodiment of a message composition interface.

FIG. 23 illustrates an embodiment of a message composition interface. In particular, FIG. 23 depicts interface 2300 as rendered on Charlie's client device. In the example of FIG. 23, Charlie is attempting to compose a message to Alice, after Alice has added Charlie to her privacy list while in block mode (e.g., after Alice's actions shown in FIG. 21). Charlie is unable to send a message to Alice, as indicated in region 2302. As mentioned above, Charlie is unable to acquire Alice's public key from platform 102 due to Alice's inclusion of Charlie on her privacy list while she is in block mode.

Figure 24:
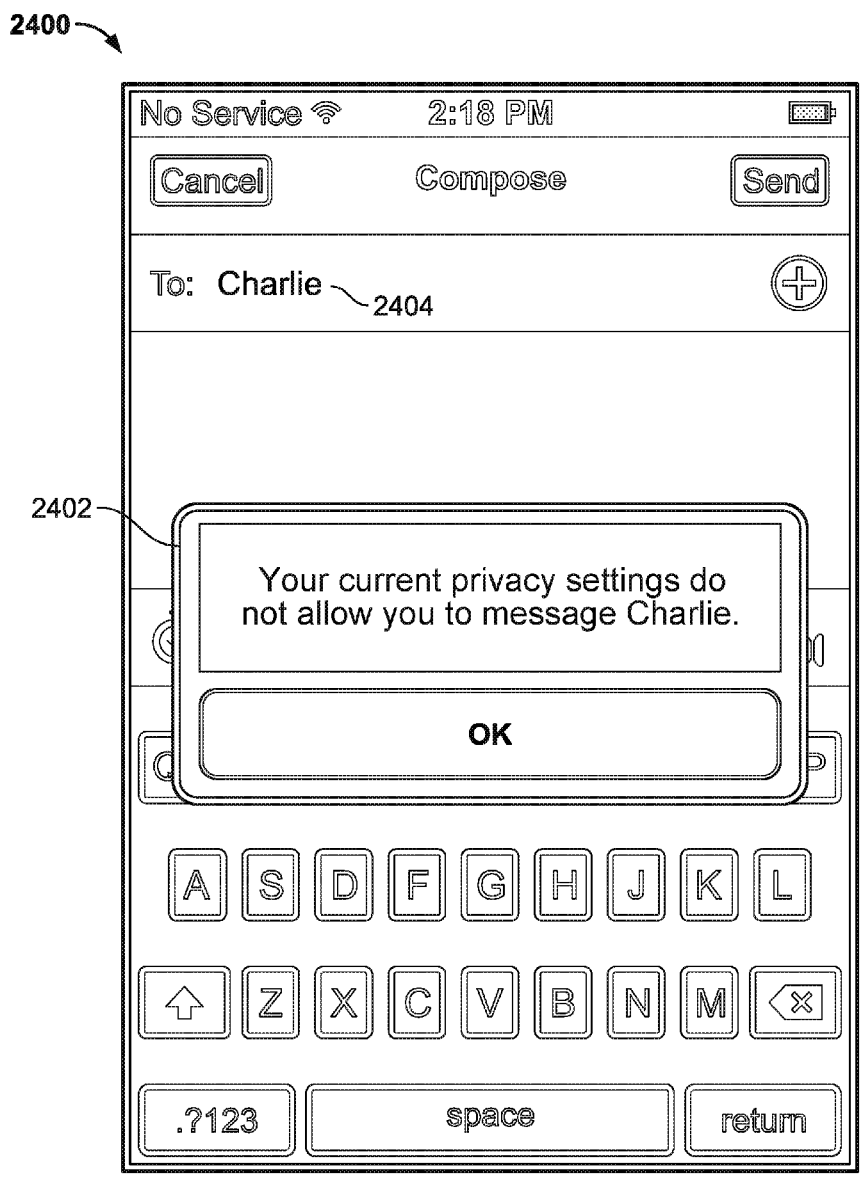
FIG. 24 illustrates an embodiment of a message composition interface.

FIG. 24 illustrates an embodiment of a message composition interface. In particular, FIG. 24 depicts interface 2400 as rendered on Alice's client device (e.g., tablet 106). In the example of FIG. 24, Alice is attempting to compose a message to Charlie, after Alice has added Charlie to her privacy list while in block mode (e.g., after Alice's actions shown in FIG. 21). Alice is symmetrically unable to send a message to Charlie, as indicated in region 2402, because she added Charlie to her block list. Alice is reminded of the reason that she is unable to message Charlie (e.g., in case she mistakenly blocked Charlie, or in case she has changed her mind about blocking Charlie).

Figure 25:
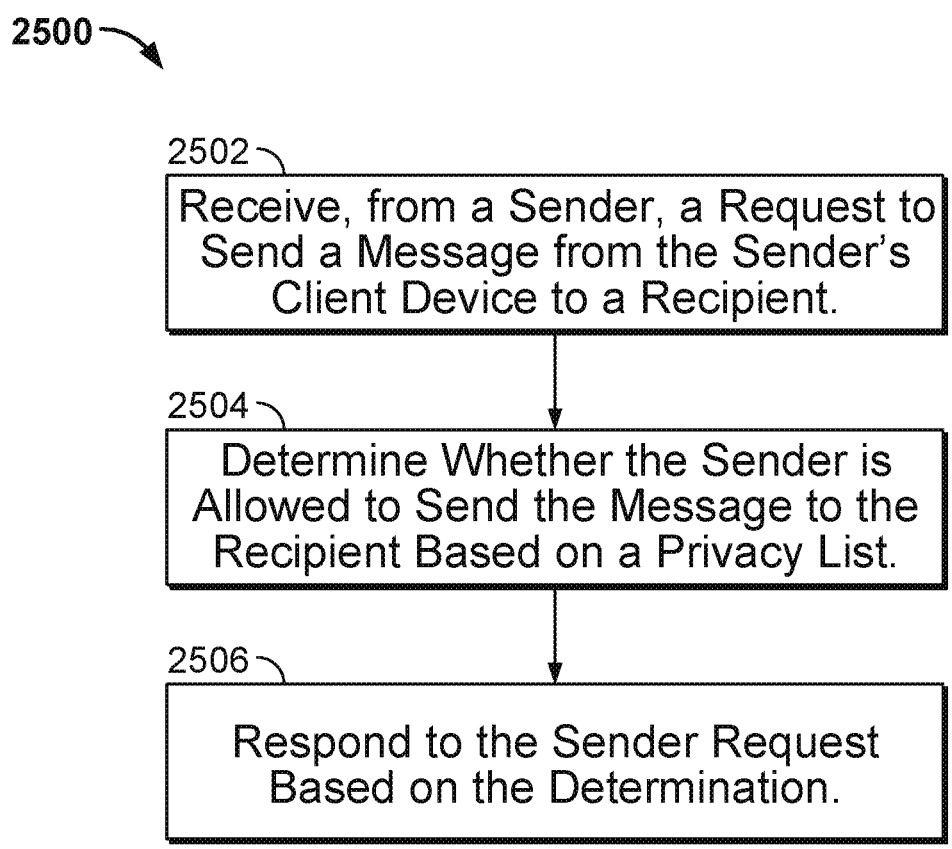
FIG. 25 illustrates an example of a process for determining whether to allow a message to be sent.

FIG. 25 illustrates an example of a process for determining whether to allow a message to be sent. In various embodiments, process 2500 is performed by platform 102. The process begins at 2502 when a request is received, from a sender, to send a message to a recipient. As one example, such a request is received at 2502 when Alice enters Bob's name into region 302 of interface 300, or presses send button 314, as applicable (e.g., when Alice's app 116 requests Bob's public key from platform 102).

At 2504, a determination is made as to whether the sender is allowed to send the message to the recipient, based on a privacy list. As one example, at 2504, platform 102 determines whether Bob is in block mode or in whitelist mode. Platform 102 also determines whether Bob's privacy list contains an entry for Alice. In various embodiments, platform 102 also determines whether Alice is in block mode or whitelist mode and further determines whether Alice's privacy list contains an entry for Bob. Specific examples of how the determination at 2504 can be performed are described in more detail in conjunction with FIG. 26.

Finally, at 2506, the sender receives a response to the send request, based on the determination made at 2504. For example, where a determination is made at 2504 that the sender is allowed to send a message to the recipient, at 2506 platform 102 sends a public key of the recipient to the sender. Where a determination is made at 2504 that the sender is not allowed to send a message to the recipient, at 2506 platform 102 does not send the public key of the recipient to the sender. In various embodiments, an applicable rejection message (e.g., as shown in interface 2300) is shown to the sender.

Figure 26:
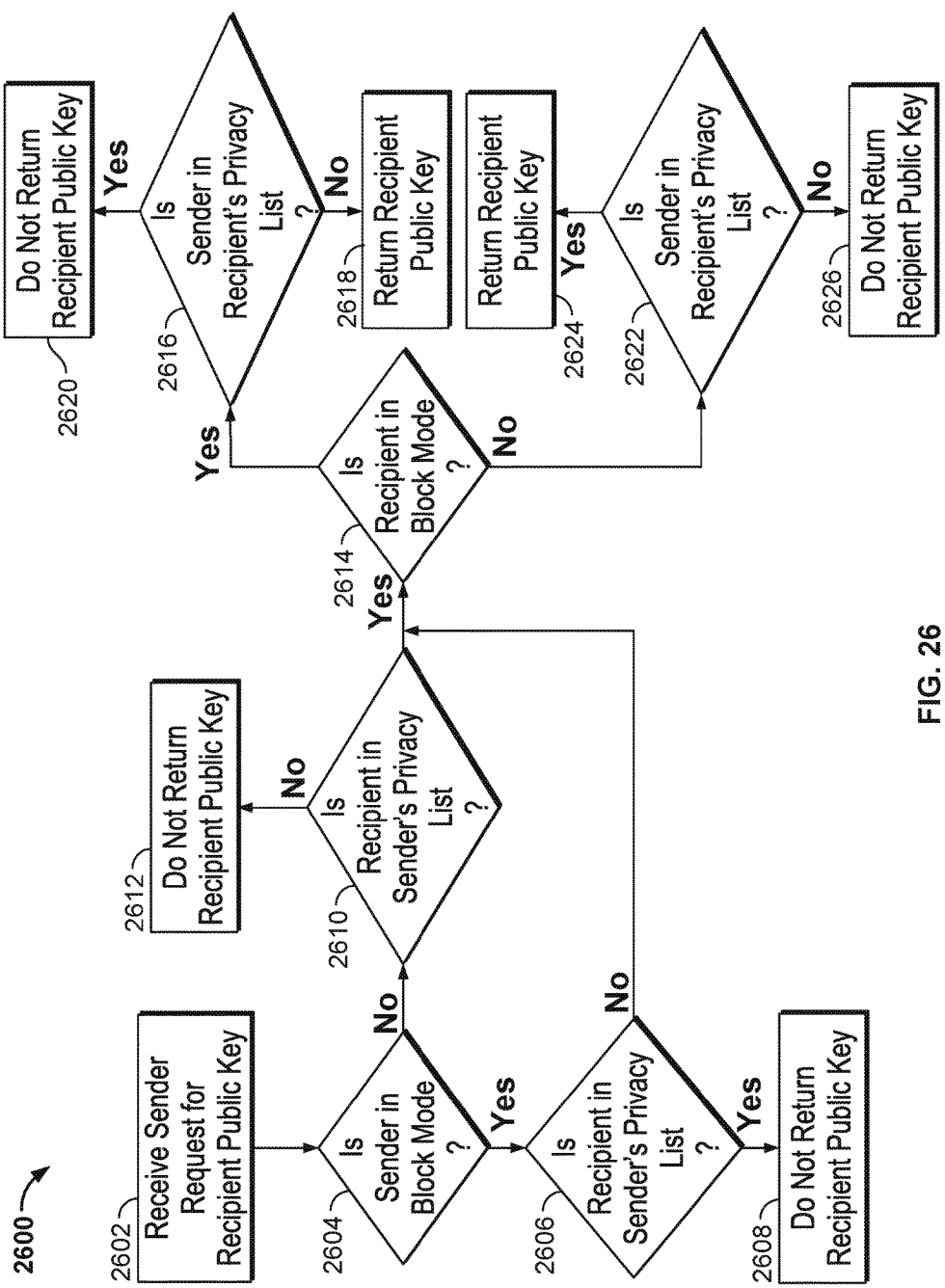
FIG. 26 illustrates an example of a process for determining whether to allow a message to be sent.

FIG. 26 illustrates an example of a process for determining whether to allow a message to be sent. In various embodiments, process 2600 is performed by platform 102. Process 2600 begins (at 2602) when a request is received from a sender for a public key of a recipient. As one example, such a request is received at 2602 when Alice enters Bob's name into region 302 of interface 300. As another example, such a request is received at 2602 when Charlie enters Alice's name into region 2304 of interface 2300. As yet another example, such a request is received at 2602 when Alice enters Charlie's name into region 2404 of interface 2400.

At 2604, a determination is made as to whether the sender is in block mode. As one example, at 2604 platform 102 examines database 120 for information about which privacy mode the sender is in. In various embodiments, a user defaults to being in the block mode, with an empty privacy list. As mentioned above, a user can change which mode the user is in, and add or remove other users from a privacy list by interacting with interfaces such as are shown in FIGS. 21 and 22. Manipulations of a user of interfaces 2100 and 2200 are transmitted to platform 102 which updates database 120 (and its encrypted entries) accordingly.

If the sender is in block mode, a determination is made (at 2606) as to whether the recipient is in the sender's privacy list. This indicates that the sender is attempting to send a message to a recipient that the sender has prevented from sending messages to the sender. Accordingly, in some embodiments due to the mutual/symmetric nature of privacy controls, the sender will be prevented from sending the message to the recipient (i.e., the sender will not be sent the recipient's public key) at 2608.

If the sender is not in block mode, the sender is instead in allow mode and a determination is made (at 2610) as to whether the recipient is in the sender's privacy list. If the recipient is not in the sender's privacy list, this indicates that the sender has not whitelisted the recipient as someone who can message the sender. Accordingly, in some embodiments due to the mutual/symmetric nature of privacy controls, the sender will be prevented from sending the message to the recipient (i.e., the sender will not be sent the recipient's public key) at 2612.

In the event the sender is in block mode and the recipient is not blocked by the sender (i.e., the recipient is not on the sender's privacy list) or in the event the sender is in allow mode and the recipient is in the sender's privacy list (i.e., the recipient is explicitly allowed by the sender's list), process 2600 next examines the recipient's privacy settings. In particular, at 2614 a determination is made as to whether the recipient is in block mode. If so, at 2616 a determination is made as to whether the sender is in the recipient's privacy list. If not, the sender will be provided with the recipient's public key at 2618 (and can send a message to the recipient).

If so, the sender will not receive the recipient's public key at 2620 (and cannot send a message to the recipient).

In the event the recipient is not in block mode, at 2622 a determination is made as to whether the sender is in the recipient's privacy list. If so, at 2624 the sender will be provided with the recipient's public key (and can send a message to the recipient). If not, at 2626 the sender will not receive the recipient's public key (and cannot send a message to the recipient).

As explained above, in the event the sender is unable to obtain the recipient's public key due to privacy settings, the sender can be presented with an appropriate message in the secure messaging application, such as message 2302 or message 2402, as applicable.

I. In-Band Identity Verification and Man-in-the-Middle Defense

Disclosed herein are techniques for generating dynamic verification content, in which a reading of a representation of a public key is blended with additional dynamic information, such as the would-be-verified person's name and current date/time. A variety of actions can be taken (e.g., based on user-preferences or, in the case of enterprise or other applicable implementations, administrator-settings) in response to a verification process being performed. For example, if a verification by a first user of a second user hasn't been performed (or has expired), the first user can be given the option to receive no indication of the lack of verification, to receive a warning, or, e.g., to block communications to/from the second user until successful verification takes place.

Suppose that one user (hereinafter referred to as Robert) of platform 102 (or an embodiment thereof) would like to exchange messages with his friend, Chris. Robert has a secure messaging application 182 installed on his smartphone 180. Chris is personally known to Robert (e.g., he is someone that Robert has met in person, and/or attributes such as his physical likeness and/or voice are otherwise already known to Robert). Robert believes that Chris's username on platform 102 is "Chris," and so he sends an initial message to Chris (e.g., using an embodiment of interface 300) with a message of "Hi, this is Robert," and a supplied username of "Chris" as the recipient. Robert receives a response back that says, "Hi, Robert!" The user with whom Robert is corresponding might be Robert's friend, Chris. However, the user might instead be an imposter, another person coincidentally named Chris (who also knows someone named Robert, or is interested in meeting someone new), etc.

Using techniques described herein, key signature verification (also referred to herein as fingerprint verification) can be performed between Robert and Chris, as well as an audiovisual physical verification, so that Robert can confirm that he is securely communicating with his friend, Chris. For example, Robert (e.g., via app 182) can ask Chris to verify himself (e.g., via app 186). Robert can likewise be asked by Chris to verify himself, and/or Robert can also spontaneously send a volunteered verification of himself to Chris. As will be described in more detail below, the verification can include a human-generated content aspect (e.g., an audiovisual recording of the person to be verified) and a digital content aspect (e.g., the incorporation of one or more digital fingerprints or representations thereof). As one example, Chris can be guided to record a video in which he is prompted to read out loud a fingerprint or other representation corresponding to a public key associated with Chris (e.g. a cryptographic hash of Chris's public key). Through this approach, Robert can verify both that the Chris with whom he is communicating is in fact his friend Chris (e.g., can verify to his satisfaction Chris's identity), and also that keys purporting to belong to Chris (e.g., obtained from platform 102 and used in accordance with the principle of first trust) in fact do (i.e., no man-in-the-middle or other tampering with communications has occurred).

The identity verification is performed individually (e.g., one for each user entry in Robert's friend list, address book, etc.). In some embodiments, the status of a given contact as being verified by a user is stored on the user's device, inside a database resident on the device and secured using an AES key derived from the password selected by Alice at portion 210 in process 200.

Verification can be performed at the time a contact is initially added as a contact, can be performed the first time a user sends a message to that contact, can be performed on demand (either spontaneously by someone sending their own verification, or in response to a request made by the other user), or otherwise initiated. Re-verification can be requested of any contact at any time. Re-verification can also be automatically required after a period of time has elapsed. For example, Robert can adjust a setting in his app 182 that forces a re-verification to take place every six months. In that scenario, once six months have elapsed after a given verification has been performed, app 182 removes the verified status associated with the verified contact (e.g., in the secure database stored on his device), and Robert can re-initiate a verification of that contact.

In some embodiments, where a user has multiple devices, any verifications performed on one device (e.g. verifications performed by Robert of Chris and by Robert of Dave) may be propagated between the verifier's devices. One way to accomplish this is for the local secure database used by his app 182 (or portions of the contents therein) to be securely backed up (e.g., in encrypted form) on server 102. When Robert enrolls a second device with server 102, a copy of the secure database (or portions of the contents, as applicable) can be downloaded to the second device. Server 102 can similarly be used to keep the data in sync (e.g., with each of Robert's devices pushing updates to the backup stored on server 102 whenever a verification change has been made). In some embodiments, Robert must independently verify contacts on each of his devices. According to some embodiments, whether or not verifications are propagated is configurable by Robert (or an administrator, as applicable, e.g., where the app is used in an enterprise context).

Identity verification techniques described herein can be used in conjunction with other techniques described herein (e.g., secure messaging provided by platform 102), and can also be incorporated into other systems (e.g., other than platform 102 or embodiments thereof). As will be described in more detail below, a digital fingerprint component and an audiovisual component can be combined (e.g., in a verifier's display). The audiovisual portion is tamper-resistant, allowing it to be transmitted in-band, even if the sender (person to be verified) or receiver (verifier) is currently being subjected to a man-in-the-middle attack.

Figure 27:
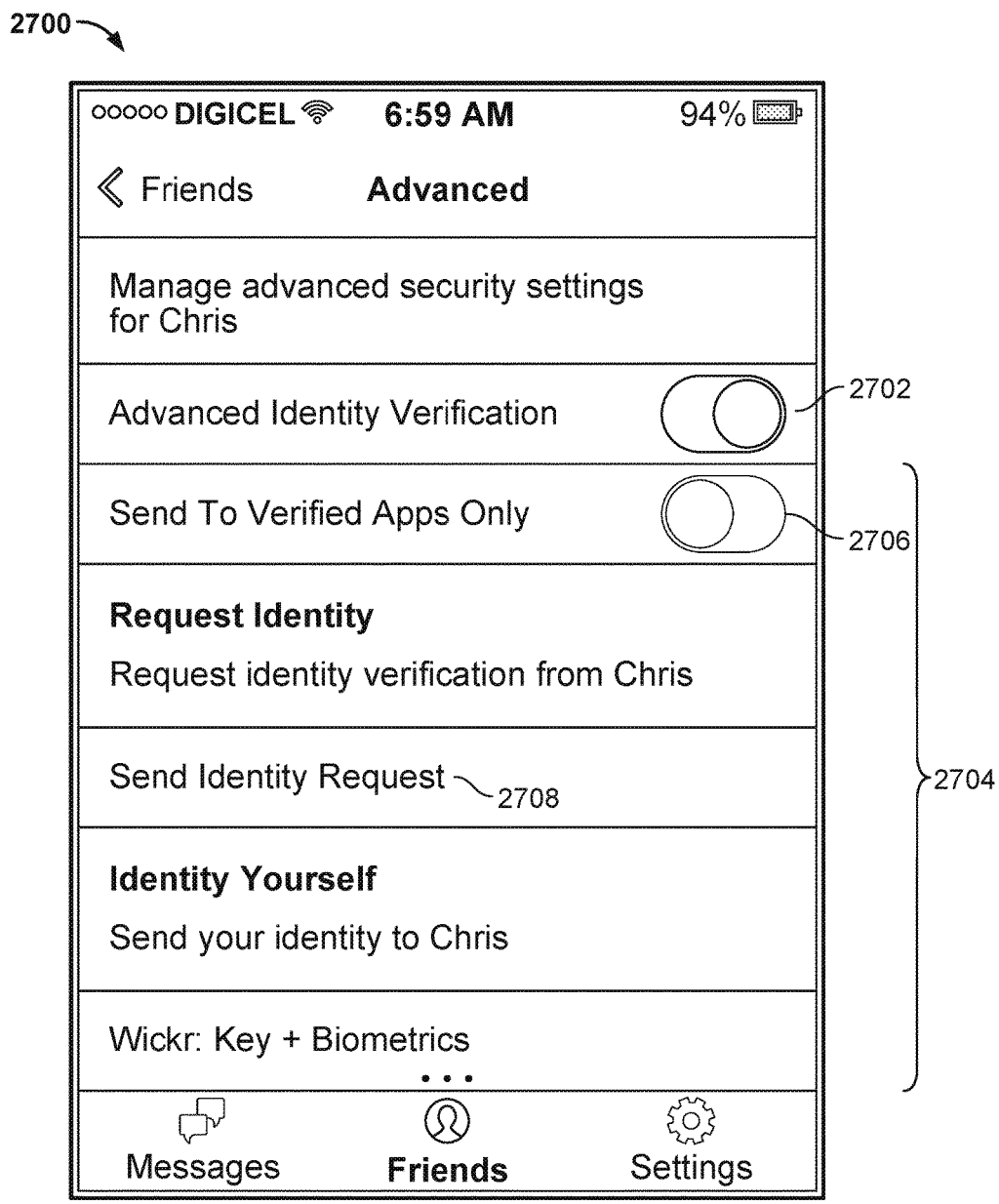
FIG. 27 illustrates an example of an interface.

FIG. 27 illustrates an example of an interface for verifying a contact. In the example shown, Robert is presented with interface 2700 after selecting "Chris" from a list of contacts within app 182. By interacting with elements shown in interface 2700, Robert can manage advanced security settings applicable to his interactions with the user named "Chris." In the example shown, Robert has turned on advanced identity verification by sliding button 2702 to the right. As such, the content depicted in region 2704 is provided to Robert. If Robert were to slide button 2702 to the left, the advanced identity verification would be deselected, and the information currently shown in region 2704 of FIG. 27 would be hidden. In some embodiments, advanced identity verification is off, by default. In this mode, any public key/fingerprint information received on behalf of a user (e.g., Chris) will be accepted by the receiving application (e.g., in accordance with first trust), without user involvement. As mentioned above, however, with advanced identity verification turned on, additional functionality is provided in app 182 to Robert, and is customizable through additional options presented in region 2704.

Robert can turn on the "send to verified apps only" option by sliding button 2706 to the right. When this mode is turned on, app 182 will only allow Robert to send/receive messages to/from users that have successfully verified themselves (described in more detail below). One way this can be performed is for app 182 to maintain a list of users Robert has verified (e.g., in a local encrypted database), and treat that list as a whitelist. If a user is not on the whitelist, the only kind of message Robert can send/receive to/from that user is a verification request or verification (e.g., Robert cannot write arbitrary messages to the user or receive arbitrary messages from the user). When the "send to verified apps only" mode is turned off (as shown in FIG. 27), app 182 will also allow Robert to communicate with unverified users. The "send to verified apps only" mode can also be configured to operate differently in various embodiments (and/or can be joined by/replaced by other modes of operation). For example, incoming messages can be checked for compromise by making sure that the key used to decrypt the message is signed with a private component of a previously verified sender's public key. If not, a warning can be shown to the user (e.g., instead of blocking the message entirely). As another example, a check can be made as to whether a public component of message encryption key was signed with a private component of a previously verified receiver's public key. If not, take an appropriate action such as warning the user, not sending a message with that key, etc. As yet another example, instead of blocking communications to/from unverified users, Robert can be given the option to allow such messages, but require they include a warning element. Examples of warning elements include popup warnings (e.g., displayed to Robert before he is presented with a message), the addition of a warning symbol/indicator inline with the message (e.g., a hazard symbol), message text being rendered in different colors based on verification (e.g., green or black text for messages with verified users, red text for unverified users, etc.).

In various embodiments, the status of a given user's verification can be presented to Robert, irrespective of whether option 2706 is turned on or off. For example, verified users can have their usernames (e.g., as shown in an address book, or in places such as region 1502) highlighted in green, unverified users can have their usernames highlighted in red, and users from which a verification has been requested (but not yet received) can have their usernames highlighted in orange.

If Robert clicks on the text in region 2708, a message requesting that Chris identify himself will be transmitted to the user, "Chris." The message can be sent in accordance with the secure messaging techniques described above. In various embodiments, the message sent to Chris in response to Robert clicking in region 2708 is automatically created by the system (e.g., Robert is not asked to supply any additional text) and includes a flag (e.g., included as one of the message controls 504) that indicates to Chris's own application that the incoming message from Robert is a verification request message. When Chris opens an identity request message, he will be asked (by a dialogue in his own app 186) whether he would like to provide an identification. If he selects "no," a further verification process will not occur. If he selects "yes," additional processing is performed (as described in more detail below).

Figure 28:
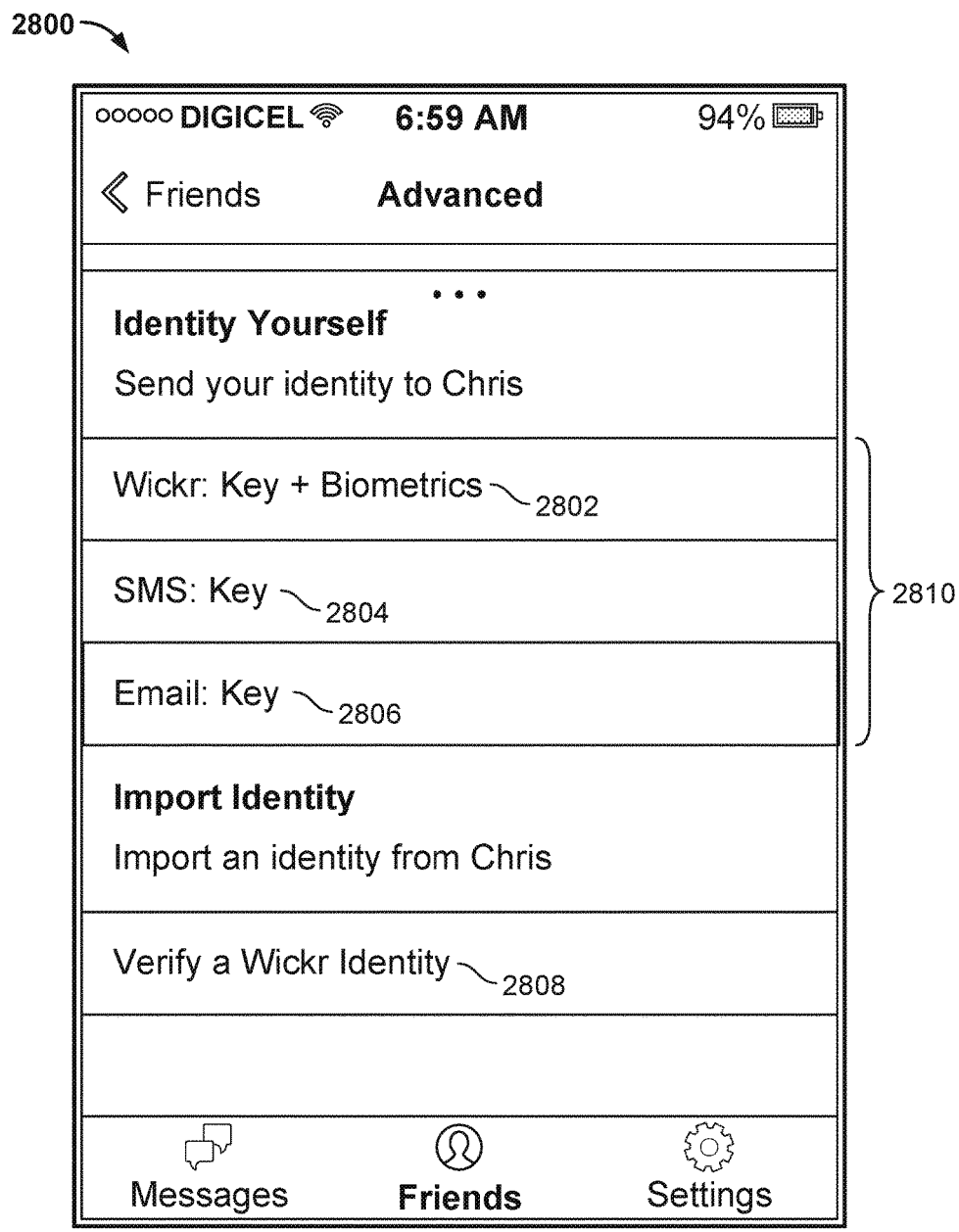
FIG. 28 illustrates an example of an interface.

Suppose Robert scrolls down in interface 2700. He will then see a view as depicted in FIG. 28. If Robert clicks on region 2802, he will be presented with an interface that guides him through generating a verification of himself and his digital fingerprint to send to Chris, described in more detail below. If he clicks on region 2804, app 182 will provide a copy of Robert's fingerprint to a native (or other) SMS application on Robert's phone, allowing Robert to send the fingerprint to his friend Chris, by supplying his friend Chris's phone number (e.g., entering the number in or selecting it from the native device address book). If he clicks on region 2806, app 182 will provide a copy of Robert's fingerprint to a native (or other) email application on Robert's phone, allowing Robert to send the fingerprint to his friend Chris, by supplying his friend Chris's email address (e.g., entering the address in or selecting it from the native device address book). The following is an example of a fingerprint/signature that can be sent via SMS or in email by Robert to Chris: "My wickr identity is: WCOMFZAIQEY7YDW6NY776ACF6HTYG3SJH-A2LAQ4LVAPJEHTJOSXQ."

If Robert's friend Chris SMSes, emails, or otherwise provides Robert with a verification of Chris's fingerprint (outside of app 182), Robert can enter the provided fingerprint by clicking the text in region 2808, which will then present Robert with a dialogue box into which he can paste, type, or otherwise enter Chris's fingerprint. App 182 will compare the value entered by Robert to the fingerprint of the key already stored by app 182, and if the values match, Chris's key will be marked as verified. If the values do not match, the verification has failed (indicating a possible man-in-the-middle attack) and Chris's key will be marked as falsely verified (or not verified, as applicable).

Figure 29:
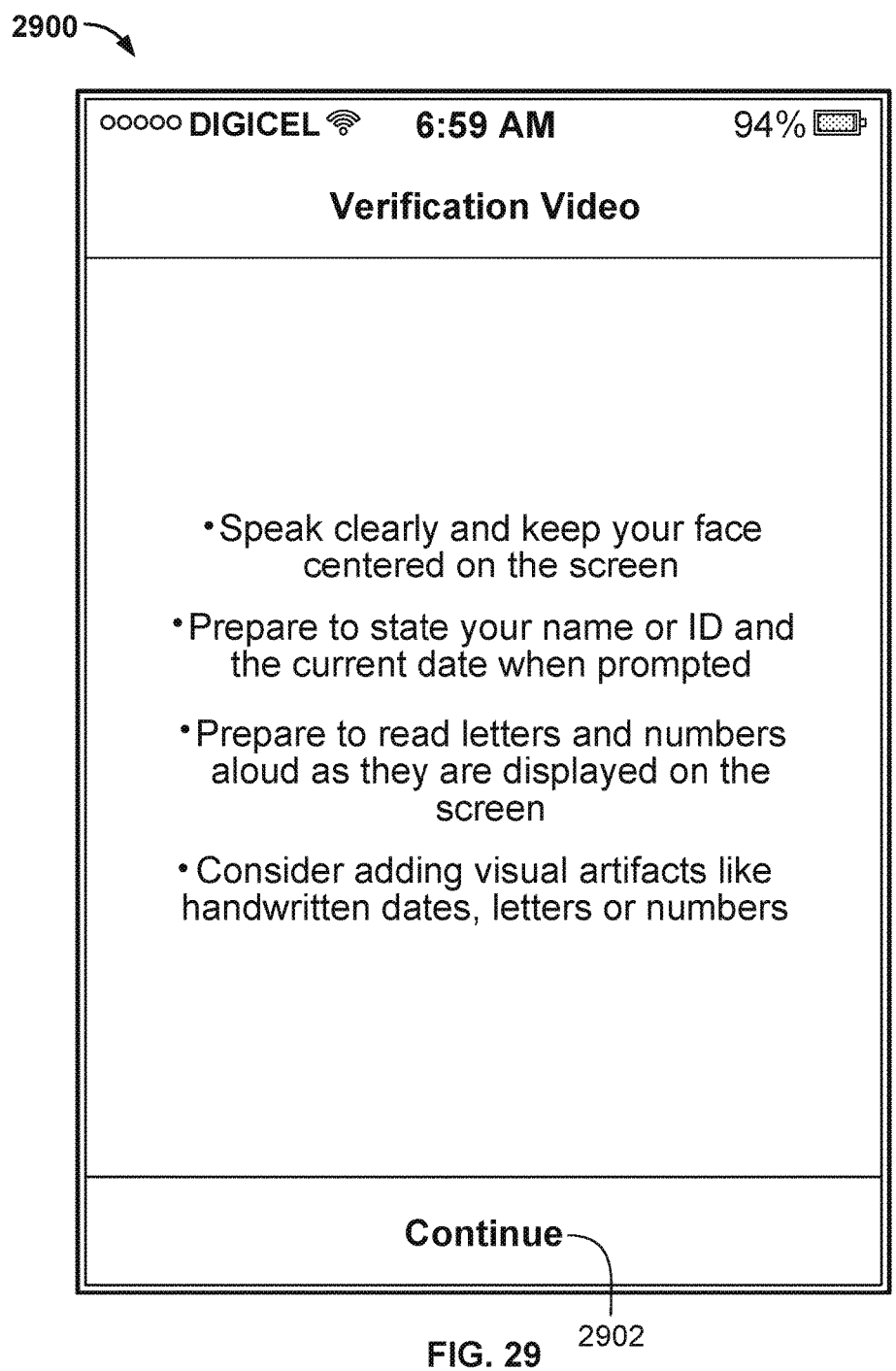
FIG. 29 illustrates an example of an interface.
Figure 30:
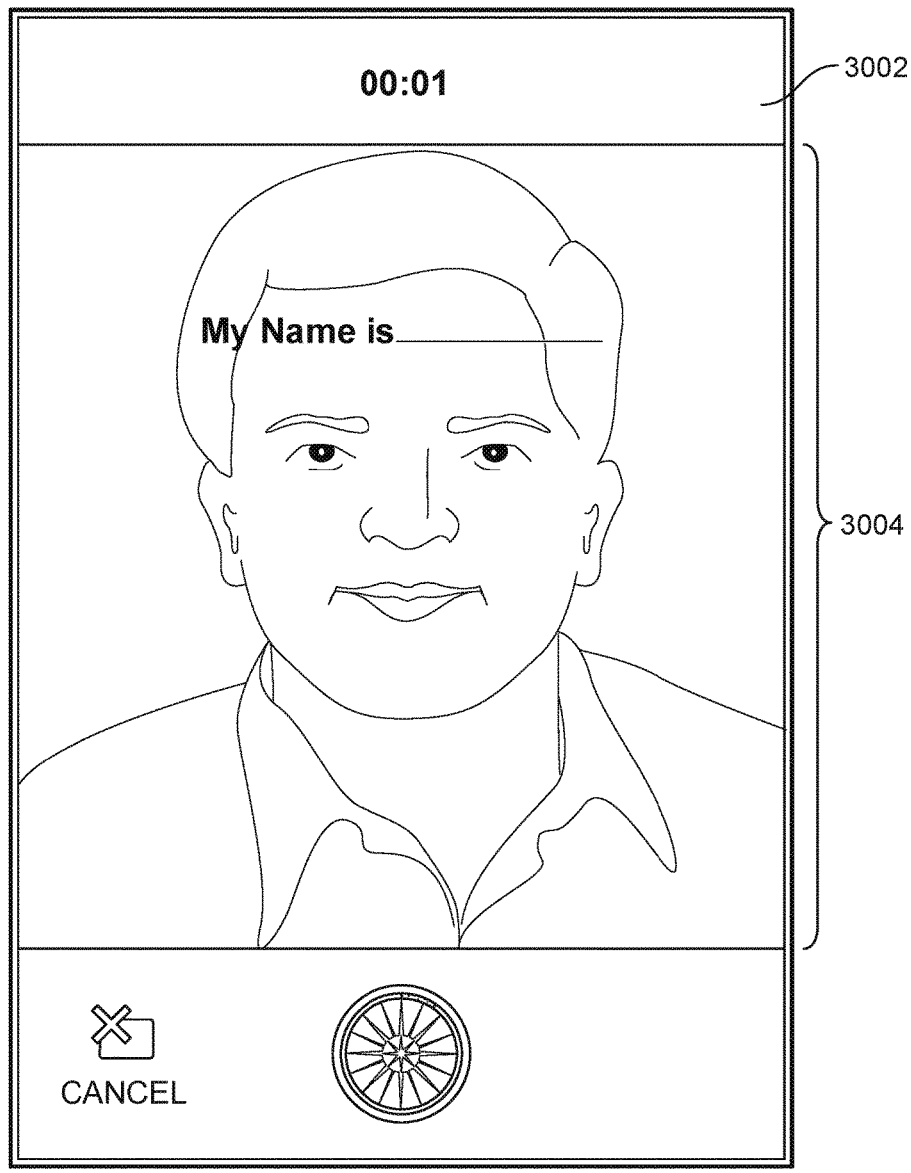
FIG. 30 illustrates an example of an interface.

Suppose Robert decides to verify himself to Chris by using the in-band identity verification functionality provided by app 182 (e.g., by clicking on the text in 2802). Robert is, in some embodiments, presented with interface 2900 (as shown in FIG. 29), which provides him with a set of tips for creating a verification message of himself for Chris. When Robert clicks on the text in region 2902, he is prompted to begin recording a video with his face clearly visible on the screen. An example interface for capturing Robert's verification is shown in FIG. 30. In the example shown, audiovisual information is captured by Robert's device (e.g., his phone's microphone and front-facing camera are turned on). The recording time elapsed is shown in region 3002. A dynamic script for Robert to follow is shown in region 3004, as is the video currently being captured. Robert is prompted to state information such as his name (whether legal name, nickname, etc.), and can also be prompted to state additional information, such as the current date and time (which can optionally be displayed to him as he starts recording).

After an appropriate amount of time has elapsed for Robert to state such information (e.g., five seconds), a representation of Robert's digital fingerprint is displayed to Robert, and Robert is prompted to read the information out loud. As mentioned above, the verification techniques described herein can be used in a variety of contexts, whether in conjunction with other functionality provided by embodiments of platform 102, or not. Accordingly, the fingerprint to be verified by Robert can vary based on the context in which the verification technique is employed. In the following example, suppose at the time Robert creates an account on platform 102, a master public/private keypair is generated on his behalf (e.g., at 202). The master private key can be used for a variety of purposes, such as signing messages/attachments, and any additional keys generated on behalf of the user (e.g., in accordance with process 250). The corresponding master public key can be included in DSBs sent by Robert (e.g., as described in conjunction with portion 404 of process 400).

Figure 31:
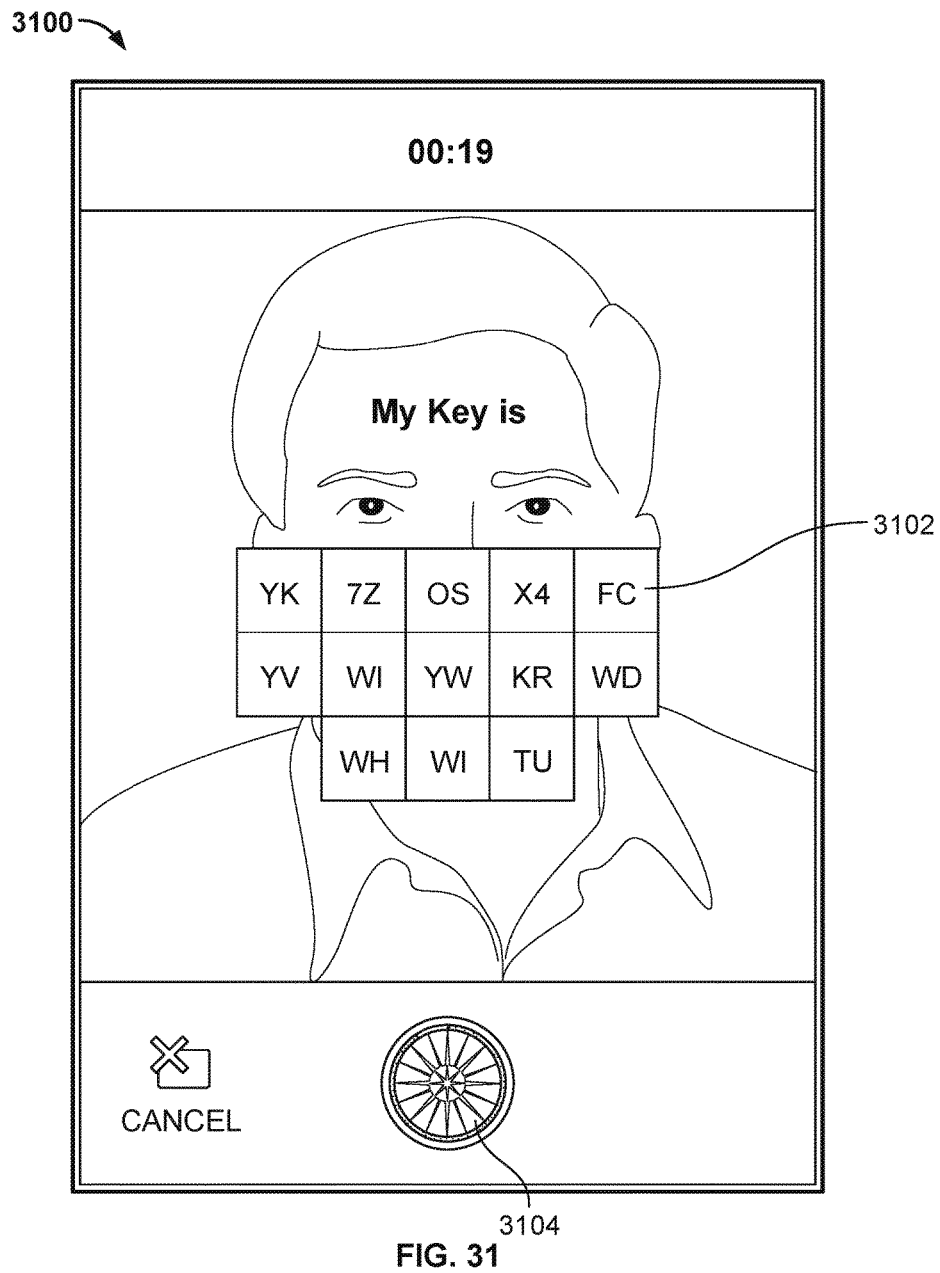
FIG. 31 illustrates an example of an interface.

As shown in FIG. 31, a representation of a cryptographic hash of Robert's public key (generated locally on Robert's device and shared with platform 102) is displayed to Robert in app 182, and Robert is prompted to read it. In some embodiments, the full cryptographic hash of Robert's public key (i.e., a fingerprint) is displayed. In other embodiments, a portion of the fingerprint, or other representation associated with the fingerprint is displayed. As one example, suppose the fingerprint comprises a 32-byte SHA value. Instead of requiring Robert to read the entire value out loud, a transformation can be used by app 182 (and similarly used by other apps such as app 185 and 116) to programmatically reduce the 32-byte SHA value to an easier to read size. As one example, a 12-byte sub-portion of the 32-byte SHA value can be displayed to Robert to read. An example of a sub-portion of a 32-byte SHA value is illustrated in region 3102 of FIG. 31. In some embodiments, a fully populated grid is initially presented to Robert. In other embodiments, a blank grid of squares is initially presented. The grid then populates with the selected sub-portion of the 32-byte SHA value, which Robert is asked to read as the grid is populated. For example, the squares can be populated every certain number of seconds, one at a time, left to right, row by row, to allow Robert to pace himself and clearly read each of the characters presented.

The recording concludes (e.g., after a set amount of time, such as 30 seconds, or when Robert clicks on button 3104). The captured audiovisual content is then transmitted to the user Chris (e.g., as a message attachment encapsulated in a DSB using techniques described above). In various embodiments, additional information is also included in the message, for example the contents of the grid displayed to Robert (that Robert was instructed to read out loud) can be saved into the audiovisual recording of Robert (e.g., as a saved overlay), or supplied as an additional attachment. As another example, a SHA-256 file signature can be taken of the audiovisual recording and included in the DSB to prove that the recording has not been altered or replaced in transit.

Figure 32:
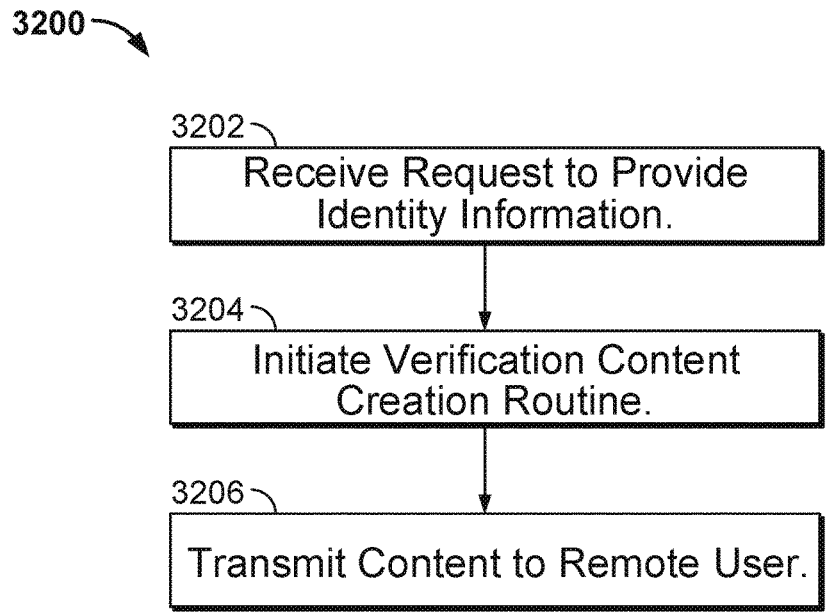
FIG. 32 illustrates an embodiment of a process for generating identity verification content.

FIG. 32 illustrates an embodiment of a process for generating identity verification content. In various embodiments, process 3200 is performed by an application installed on a client device, such as app 182 installed on client device 180. The process begins at 3202 when a verification request is received. The request can be received in a variety of ways. As one example, when Robert spontaneously initiates a verification of himself to the user, "Chris," a verification request is received at 3202 when Robert clicks on region 2802 of interface 2800. As another example, suppose Robert would like the user "Chris" to verify himself to Robert. When Robert clicks on region 2708 of interface 2700, a control message is sent to Chris. When Chris opens the message, he is presented with the option of performing a verification by clicking on a "yes" button or otherwise indicating agreement to proceed (also an example of portion 3202 of process 3200).

At 3204, a verification routine is initiated. As one example, where Robert has decided to spontaneously verify himself to Chris, the verification routine is initiated at 3204 when Robert clicks on "Continue" button 2902 (and the script of what Robert should say during the audiovisual recording commences). Similarly, where Chris is verifying himself in response to a request from Robert, the verification routine is initiated when Chris selects a method of verification option from an interface that corresponds to region 2810 of interface 2800. Finally, at 3206, a result of the verification routine is transmitted to a remote user. As one example, where Robert is spontaneously verifying himself to Chris, when Robert's audiovisual recording (e.g., made using interface 3100) completes, it is packaged into a DSB (as explained above) and transmitted to Chris (e.g., via platform 102) at 3206. As another example, where Chris has accepted a request from Robert to verify himself, once Chris's audiovisual recording has completed, the recording is similarly packaged into a DSB and transmitted to Robert at 3206. Where, instead of choosing to make an audiovisual recording (e.g., by selecting option 2802) Chris (or Robert) instead chooses to verify himself using an SMS or email, portion 3206 of process 3200 occurs when the applicable SMS or email message is sent (e.g., in accordance with techniques described above).

Figure 33:
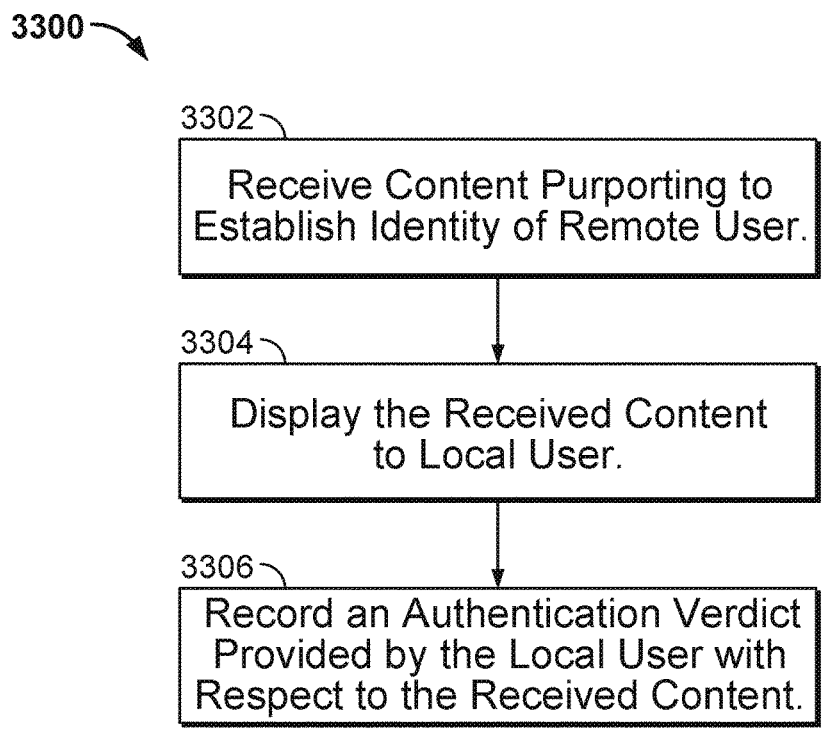
FIG. 33 illustrates an embodiment of a process for verifying identity verification content.

FIG. 33 illustrates an embodiment of a process for verifying identity verification content. The process begins at 3302 when content purporting to establish an identity of a remote user is received. As one example, when Robert chooses to spontaneously verify himself to Chris, Chris receives such content at 3302 when he obtains Robert's audiovisual recording (e.g., by downloading a DSB containing the recording). As another example, if Robert requests that Chris verify himself, Robert receives such content at 3302 when Chris responds with an audiovisual recording (e.g. generated using an embodiment of process 3200), an SMS (e.g., created after selecting 2804), or an email (e.g., created after selecting 2806), as applicable. At 3304, the received content is displayed to the local user. Returning to the example where Robert is spontaneously verifying himself to Chris, at 3304, Chris (e.g., using his own app 186 on his own device 184) downloads the DSB prepared by Robert's app 182, and extracts the audiovisual attachment. The audiovisual recording is played for Chris, and Chris's app 186 displays a cryptographic hash of Robert's public key (e.g., originally obtained from platform 102), e.g., as an overlay on the audiovisual content playing. The overlay can be positioned to appear on top of the recorded video, and/or can also appear elsewhere, such as above or below the video, or partially overlapping the video. Chris scrutinizes the biometric attributes present in the audiovisual content (e.g., Robert's voice and likeness, and any other probative information—such as the room in which Robert recorded the video, the presence of Robert's pets or family members, desk props, etc.), confirming Robert's identity to his satisfaction. Chris also ensures that the displayed hash value of Robert's key (provided by Chris's app 186) matches the value that Robert communicates in the video. As mentioned above, if the verification is approved by the viewer (i.e., the audiovisual content and fingerprint information are confirmed), at the conclusion of the video clip, the viewer can indicate that the user (in the video) should be verified (e.g., by clicking a "confirm" button) and a verification status associated with that user (e.g., as stored in a secure database local to the verifier's device) is changed (e.g. from not verified to verified or from pending to verified as applicable). If the viewer is not satisfied with the identification, the viewer can similarly click a "deny" or other appropriate button and the user's verification status can be set to "not verified" or another appropriate status. As mentioned above, re-verification can be performed at any time, so in the event an erroneous choice is made (e.g., Robert erroneously indicates that Chris is not Chris by clicking the wrong button), the verification process can be repeated, allowing for the status to be corrected.

Figure 34A:
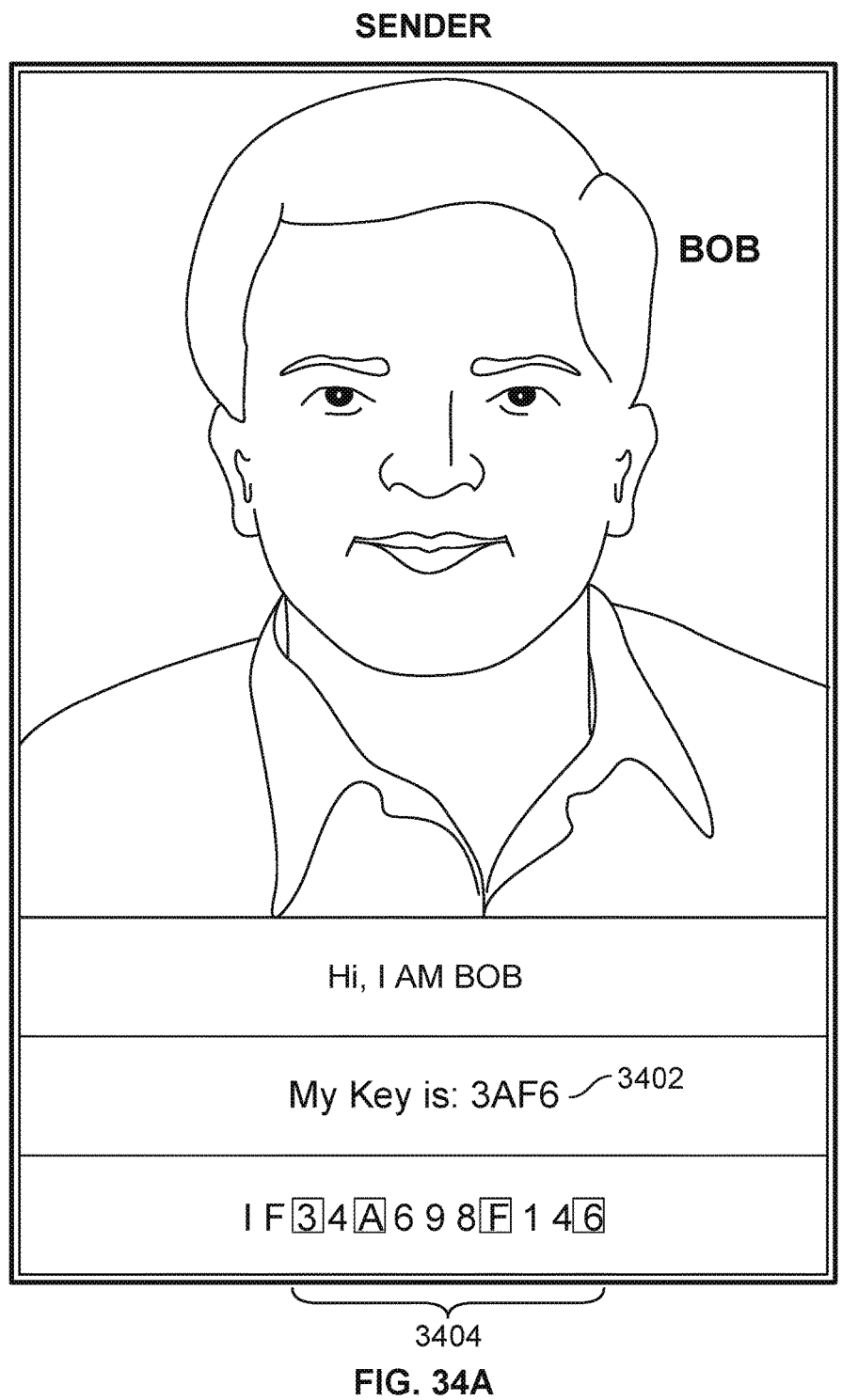
FIG. 34A illustrates an embodiment of an interface.
Figure 34B:
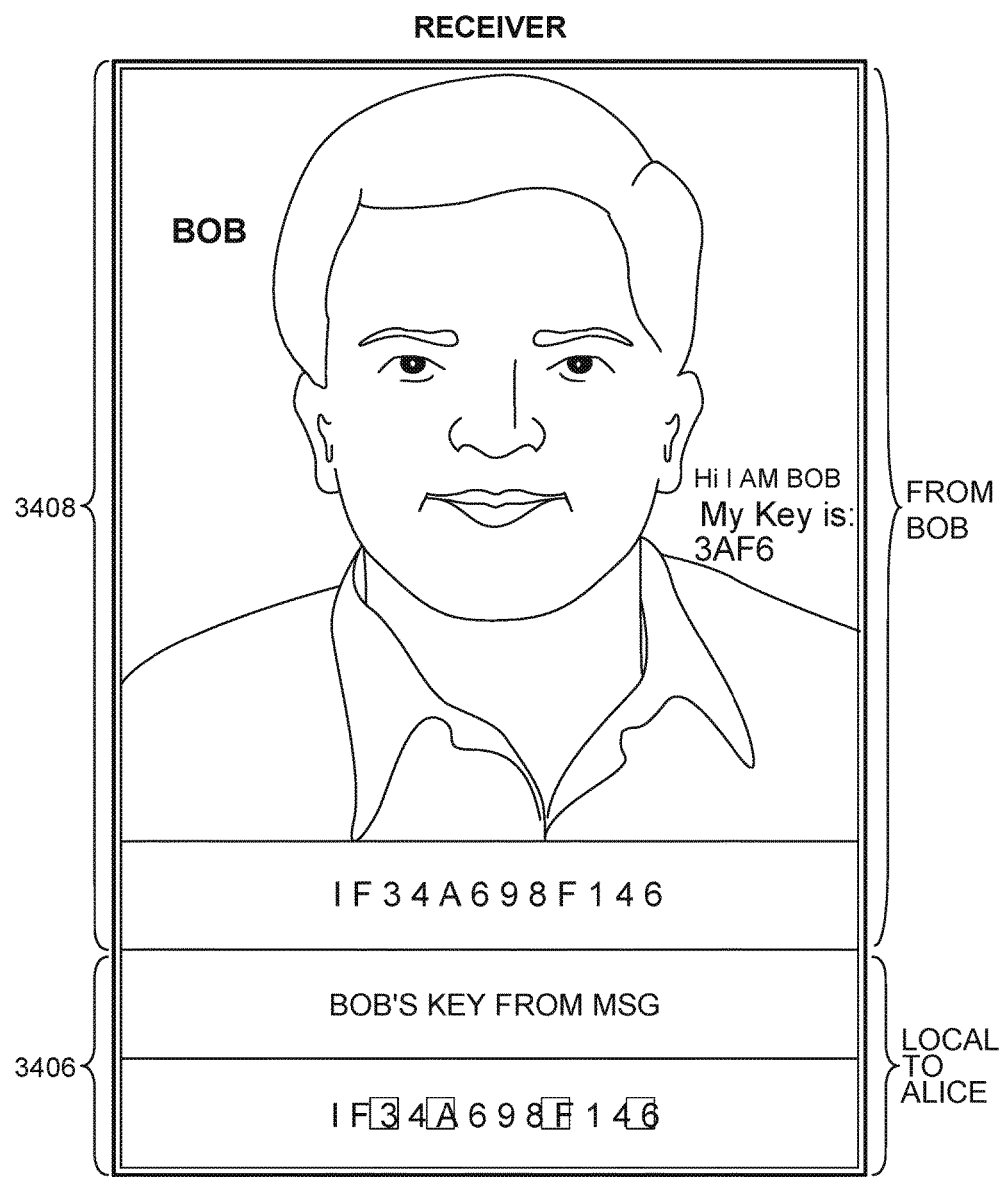
FIG. 34B illustrates an embodiment of an interface.

Alternate examples of interfaces for generating and viewing verification video and other data are shown in FIGS. 34A and 34B, respectively. FIG. 34A is an example of an interface shown to the person recording the video (in this example, Bob). The sub-portion of Bob's fingerprint to be spoken out-loud is "3AF6" and is indicated to Bob both in conjunction with a dynamic script (in region 3402) and by an indication of where, within the whole fingerprint, the sub-portion was extracted (3404). Alice's app has a key stored for Bob and is able to display the local copy of his stored key (shown in the bottom portion of Figure of 34B at 3406) against the verification transmission shown in the top portion of FIG. 34B at 3408. In some embodiments, Alice is given controls, such as a set of checkmarks that she can tick as she verifies Bob's information. In some embodiments, Alice is required to re-enter her app password in conjunction with ticking the checkmarks.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for verifying a second user's identity, the method comprising:
   transmitting, from a first device, a first verification request to a second user of a second device;
   receiving, at the first device, a response to the first verification request, wherein the response includes at least one of a first representation of a first key of the second user;
   obtaining, by the first device, the first key from a first server;
   generating, by the first device, a second representation of the first key;
   comparing, at the first device, the first representation of the first key received from the second device with the second representation of the first key; and
   verifying, by the first device, the second user when the first representation matches the second representation.

2. The method of claim 1, further comprising:
   transmitting, by the first device, a verification completion to the second device when the first representation matches the second representation.

3. The method of claim 1, wherein the second representation of the first key is generated by hashing the first key received from the first server.

4. The method of claim 1, wherein the response includes an audiovisual recording.

5. The method of claim 1, comprising:
   transmitting, by the first device, one or more encrypted communications to the second device.

6. The method of claim 1, comprising:
   blocking, by the first device, communications with the second device when the first representation does not match the second representation.

7. A system for verifying a second user's identity, the system comprising:
   an interface configured to transmit a first verification request to a second user of a second device, receive a response to the first verification request, wherein the response includes at least one of a first representation of a first key of the second user, and obtain the first key from a first server;

a processor configured to generate a second representation of the first key, compare the first representation of the first key received from the second device with the second representation of the first key, and verify the second user when the first representation matches the second representation; and a memory coupled to the processor and configured to provide the processor with instructions for verifying the second user's identity.

8. The system of claim 7, wherein the interface is further configured to transmit a verification completion to the second device when the first representation matches the second representation.

9. The system of claim 7, wherein the processor is further configured to generate the second representation of the first key by hashing the first key received from the first server.

10. The system of claim 7, wherein the response includes an audiovisual recording.

11. The system of claim 7, wherein the interface is further configured to transmit one or more encrypted communications to the second device.

12. A non-transitory computer readable medium comprising instructions, that when executed by a processor, perform the steps of:

transmitting a first verification request to a second user of a second device;

receiving a response to the first verification request, wherein the response includes at least one of a first representation of a first key of the second user;

obtaining the first key from a first server;

generating a second representation of the first key;

comparing the first representation of the first key received from the second device with the second representation of the first key; and verifying the second user when the first representation matches the second representation.

13. The non-transitory computer readable medium of claim 12, further comprising instructions for:

transmitting a verification completion to the second device when the first representation matches the second representation.

14. The non-transitory computer readable medium of claim 12, wherein the second representation of the first key is generated by hashing the first key received from the first server.

15. The non-transitory computer readable medium of claim 12, wherein the response includes an audiovisual recording.

16. The non-transitory computer readable medium of claim 12, comprising instructions for:

transmitting one or more encrypted communications to the second device.

17. The non-transitory computer readable medium of claim 12, comprising instructions for:

blocking communications with the second device when the first representation does not match the second representation.

\* \* \* \* \*